US011726042B2

(12) United States Patent
Blatz et al.

(10) Patent No.: US 11,726,042 B2
(45) Date of Patent: *Aug. 15, 2023

(54) SYSTEMS AND METHODS FOR DETECTION

(71) Applicant: Photoswitch Biosciences, Inc., Menlo Park, CA (US)

(72) Inventors: Andrew Blatz, Menlo Park, CA (US); Thomas Lila, Menlo Park, CA (US); Jay Trautman, Menlo Park, CA (US)

(73) Assignee: PHOTOSWITCH BIOSCIENCES, INC., Menlo Park, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/323,188

(22) Filed: May 18, 2021

(65) Prior Publication Data

US 2022/0026364 A1 Jan. 27, 2022

Related U.S. Application Data

(63) Continuation of application No. 16/475,864, filed as application No. PCT/US2018/013188 on Jan. 10, 2018, now Pat. No. 11,041,806.

(Continued)

(51) Int. Cl.
*G01N 21/64* (2006.01)
(52) U.S. Cl.
CPC ..... *G01N 21/6452* (2013.01); *G01N 21/6408* (2013.01); *G01N 21/6458* (2013.01); *G01N 21/6486* (2013.01); *G01N 2021/6463* (2013.01)

(58) Field of Classification Search
CPC ........... G01N 21/6458; G01N 21/6452; G01N 21/6486; G01N 21/6408;
(Continued)

(56) References Cited

U.S. PATENT DOCUMENTS 7,812,952 B2 10/2010 Delaage et al.
11,041,806 B2 * 6/2021 Blatz ................. G01N 21/6408
(Continued)

FOREIGN PATENT DOCUMENTS

DE 19748211 A1 5/1999
JP S60242344 A 12/1985
(Continued)

OTHER PUBLICATIONS

Altschul, S F et al. "Gapped BLAST and PSI-BLAST: a new generation of protein database search programs." Nucleic acids research vol. 25,17 (1997): 3389-402. doi:10.1093/nar/25.17.3389.
(Continued)

*Primary Examiner* — Irakli Kiknadze
(74) *Attorney, Agent, or Firm* — Wilson Sonsini Goodrich & Rosati

(57) ABSTRACT

Provided herein are devices, systems, and methods for detection of sensors, such as light-detectable sensors. The devices or systems as described herein may comprise an illumination assembly configured to direct a light to at least a well of a plurality of wells in the array of wells and a detection assembly configured to detect a signal from the well.

20 Claims, 13 Drawing Sheets

Related U.S. Application Data

(60) Provisional application No. 62/444,564, filed on Jan. 10, 2017.

(58) Field of Classification Search
CPC ... G01N 2021/6463; G01N 2021/6419; G01N 2021/6441; G01N 21/6456; G01N 2201/06113; G01N 33/5008; G01N 33/502; G01N 33/6872; G01N 21/6428; G01N 21/648; G01N 2021/6421; G01N 2201/062; G01N 2021/6439; G01N 2201/0446; G01N 2021/6482; G01N 2201/0833; G01N 15/1459; G01N 15/1429; G01N 2021/8592; G01N 2015/0053; G01N 2015/0038; G01N 2015/1006; G01N 21/47; G01N 21/31; G01N 21/255; G01N 2021/4709; G01N 2201/0675; G01N 21/77; G01N 21/64; G01N 21/253; G01N 21/645; G01N 21/75; G01N 21/6454; G01N 2201/08; G01N 2021/6434; G01N 2021/0346; G01N 2201/067; G01N 2021/757; G01N 2021/7786; G01N 2201/068; G01N 21/251; G01N 2021/6471; G01N 27/44721; G01N 21/35; G01N 21/3577; G01J 1/02; G01J 1/04; G01J 3/447; G01J 3/2803; G01J 3/0291; G01J 3/2823; G01J 3/0224; G01J 3/0208; G01J 3/021; G01J 3/10; G01J 3/36; G01J 3/12; G01J 2003/1213; G01J 2003/2826; G01J 3/4406; G01J 3/14; G06T 2207/10024; G06T 2207/10064; G06T 7/90; G06T 2207/30064; G06T 2207/10036; H04N 5/372; A61N 5/0622; C40B 60/12; C12Q 1/6874; A61B 5/0075; A61B 5/4869; A61B 5/447; A61B 90/361; A61B 5/443; A61B 90/30; A61B 2562/028; A61B 2560/0425; A61B 2090/3618; A61B 2090/309; A61B 2562/0233; G16H 50/50; G06F 18/2135; G02B 21/0064; G02B 26/06; G02B 21/006; G02B 21/361; G02B 21/0072; G02B 21/0076; G02B 21/0056; G02B 21/008; G02B 21/16; B01L 2300/0816; B01L 2300/0663; B01L 2300/0654; B01L 2300/168; B01L 9/527; B01L 3/502738; B01L 3/502715; B01L 3/5085; Y10T 436/143333
USPC ...................................................... 250/458.1
See application file for complete search history.

(56) References Cited

U.S. PATENT DOCUMENTS

| | | | |
|---|---|---|---|
| 2002/0113213 | A1 | 8/2002 | Amirkhanian et al. |
| 2005/0157299 | A1* | 7/2005 | Heffelfinger ......... G01N 21/645 356/417 |
| 2006/0132765 | A1 | 6/2006 | Fouquet et al. |
| 2007/0008536 | A1 | 1/2007 | Mitani et al. |
| 2008/0117421 | A1 | 5/2008 | Yamaguchi et al. |
| 2008/0179539 | A1* | 7/2008 | Rasnow ............ G01N 21/6454 250/458.1 |
| 2010/0145627 | A1* | 6/2010 | Wang .................. G01N 21/253 356/73 |
| 2011/0062531 | A1 | 3/2011 | De et al. |
| 2013/0224756 | A1 | 8/2013 | Cohen et al. |
| 2014/0101785 | A1 | 4/2014 | Logger et al. |
| 2016/0041095 | A1 | 2/2016 | Rothberg et al. |

FOREIGN PATENT DOCUMENTS

| | | |
|---|---|---|
| JP | S62223644 A | 10/1987 |
| JP | 2000249650 A | 9/2000 |
| JP | 2003202292 A | 7/2003 |
| JP | 2008508537 A | 3/2008 |
| JP | 2009180516 A | 8/2009 |
| JP | 2011059095 A | 3/2011 |
| WO | WO-03098200 A1 | 11/2003 |
| WO | WO-2004017374 A2 | 2/2004 |
| WO | WO-2017192579 A1 | 11/2017 |

OTHER PUBLICATIONS

Karlin, S, and S F Altschul. "Applications and statistics for multiple high-scoring segments in molecular sequences." Proceedings of the National Academy of Sciences of the United States of America vol. 90,12 (1993): 5873-7. doi:10.1073/pnas.90.12.5873.

Supplementary European Search Report dated Sep. 21, 2020 for Application No. EP 18 73 8807, (9 pages).

Dioumaev AK, et al. Proton transport by proteorhodopsin requires that the retinal Schiff base counterion Asp-97 be anionic. Biochemistry. Jun. 3, 2003;42(21):6582-7.

\* cited by examiner

SYSTEMS AND METHODS FOR DETECTION

CROSS-REFERENCE

This application is a Continuation Application of U.S. patent application Ser. No. 16/475,864, filed on Jul. 3, 2019, which is based on National Stage Entry of International Application PCT/US2018/013188, filed on Jan. 10, 2018, which claims priority to U.S. Provisional application 62/444,564, filed on Jan. 10, 2017, each of which is entirely incorporated herein by reference in their entirety.

BACKGROUND

Systems for analysis of cellular arrays are useful in medical research, life sciences, and other applications. Existing systems to measure cellular outputs typically include an array of wells, such as a microplate, to which cells are added to each well. Individual wells of this system are measured in succession utilizing a detector setup, such as a microscope and CCD camera. These systems typically provide single cell resolution but lack parallel acquisition from multiple wells. Other systems are designed for parallel acquisition of cellular outputs from multiple wells of an array. However, these systems typically lack temporal resolution.

SUMMARY

An aspect of the present disclosure provides a system. In some embodiments, the system may comprise: an illumination assembly configured to direct light from an excitation source to a plurality of wells of an array of wells and a detection assembly. In some embodiments, each well of the plurality of wells may be configured to receive a cell. In some embodiments, at least a portion of the light may illuminate at least a portion of each well of the plurality of wells to form at least partially illuminated wells. In some embodiments, the detection assembly may be configured to: (i) collect a signal from each at least partially illuminated well of the plurality of wells and (ii) transfer each signal to a corresponding detector. In some embodiments, collection of each signal of a plurality of signals may occur substantially in parallel. In some embodiments, a lens may be configured to focus at least a portion of the signal onto the corresponding detector. In some embodiments, the transfer of each signal may occur substantially in parallel. In some embodiments, at least a portion of the signal from each well of the plurality of wells may be transferred to an independent detector. In some embodiments, a sampling rate of the signal across the plurality of wells may be greater than about 100 Hertz (Hz).

In some embodiments, collection of the signal from each well of the plurality of wells may occur simultaneously. In some embodiments, collection of more than one signal from each well of the plurality of wells may occur substantially in parallel. In some embodiments, the plurality of wells may be greater than 5 wells. In some embodiments, the collection of more than one signal from each well of the plurality of wells may occur within a time frame of less than about 20 seconds. In some embodiments, the system may be configured to provide transmitted light to each well of the plurality of wells. In some embodiments, the detection assembly may be configured to collect a signal from each well of the plurality of wells along an axis that may be substantially parallel to an incoming path of transmitted light to provide a system having transmission geometry.

In some embodiments, the detector may be an optical detector. In some embodiments, the signal may be a light signal. In some embodiments, the signal may be converted to an electrical current signal by the detector. In some embodiments, the sampling rate may be from about 8,000 Hz to about 12,000 Hz. In some embodiments, the sampling rate may be about 10,000 Hz. In some embodiments, the detection assembly may comprise a signal collection optics. In some embodiments, a numerical aperture of the signal collection optics may be from about 0.2 to about 0.8. In some embodiments, the numerical aperture of the signal collection optics may be about 0.5.

In some embodiments, at least one well of the plurality of wells may be fully illuminated. In some embodiments, a ratio of an area of a well from which a signal may be collected to an area of a signal that may be transferred onto a detector may be from about 1:0.5 to about 1:1.5. In some embodiments, the ratio may be about 1:1. In some embodiments, the area that may be illuminated may comprise cells. In some embodiments, the area that may be illuminated may comprise a bottom surface of the well.

In some embodiments, the illumination assembly may comprise an excitation optics. In some embodiments, a focal length of the excitation optics into each of the plurality of wells may be longer than a focal length of the signal collection optics collecting the signal from a corresponding well of the plurality of wells. In some embodiments, a change in a light intensity of the excitation source may have less than about a 1 millisecond response lag.

In some embodiments, the illumination assembly may comprise 2 or more excitation sources. In some embodiments, the 2 or more excitation sources may be different. In some embodiments, the 2 or more excitation sources may be same. In some embodiments, the excitation source may provide a light intensity of greater than about 5 milliWatts per square millimeter ($mW/mm^2$) to one or more wells of the plurality of wells. In some embodiments, the excitation source may provide a light intensity of greater than about 5 $mW/mm^2$ to each well of the plurality of wells. In some embodiments, the light may comprise a wavelength from about $10^{-7}$ to about $10^{-5}$ meters. In some embodiments, the light may comprise a wavelength from about 400 to about 800 nanometers (nm). In some embodiments, the detection assembly may collect the signal from each well of the plurality of wells at a wavelength of from about 400 nm to about 1000 nm.

In some embodiments, the signal from each well of the plurality of wells may be transferred to a corresponding detector. In some embodiments, the corresponding detector may comprise a photodiode. In some embodiments, the photodiode may comprise a p-i-n (PIN) photodiode, a p-n (PN) photodiode, an Avalanche photodiode, a Schottky photodiode, or any combination thereof. In some embodiments, the photodiode may detect a fluorescence, a phosphorescence, a luminescence, or any combination thereof. In some embodiments, the corresponding detector may be configured to detect a light comprising a wavelength from about $10^{-7}$ to about $10^{-5}$ meters. In some embodiments, the detection assembly may comprise a plurality of corresponding detectors. In some embodiments, each corresponding detector of the plurality of corresponding detectors may correspond to a different well of the plurality of wells. In some embodiments, each corresponding detector of the plurality of corresponding detectors may correspond to a unique well of the plurality of wells.

In some embodiments, the plurality of wells may be the array of wells. In some embodiments, the plurality of wells may comprise at least about: 16 wells, 32 wells, 96 wells, or 384 wells.

In some embodiments, the system may comprise a filter. In some embodiments, the filter may comprise an emissions filter. In some embodiments, the system may comprise a plurality of lenses and a plurality of detectors. In some embodiments, each detector of the plurality of detectors may be operatively connected to a lens of the plurality of lens. In some embodiments, the lens may comprise a focusing lens. In some embodiments, the lens may comprise a single collimation lens. In some embodiments, the detection assembly may comprise an amplifier. In some embodiments, the amplifier may comprise an on-board trans-impedance amplifier.

In some embodiments, the each well of the plurality of wells may comprises a plurality of cells. In some embodiments, at least a portion of the plurality of wells may comprise a light-detectable sensor. In some embodiments, the system may detect a presence or an absence of activation of the light-detectable sensor within each well of the plurality of wells in a time period ranging from about 1 millisecond to about 1 minute. In some embodiments, the system may measure a change in an intensity of a signal from the light-detectable sensor within each well of the plurality of wells in less than about a millisecond and with a signal to noise ratio in excess of about 5/10 mV cell membrane potential change.

In some embodiments, the light may comprise a timed pulse of light. In some embodiments, the timed pulse of light may be less than about 100 milliseconds in duration. In some embodiments, the system may comprise timed pulses of light. In some embodiments, timed pulses of light may comprise one or more wavelengths.

In some embodiments, the change in the intensity of the signal from the light-detectable sensor may result from contacting at least a cell of the plurality of cells with a Chop1 protein, Chop2 protein, an expressed protein having at least about 52% sequence homology, about 52% sequence length, or a combination thereof to a Chop1 or a Chop2 protein, an LiGluR, or any combination thereof. In some embodiments, the change in the intensity of the signal from the light detectable sensor may result from (i) a light-mediated ligand-activation of an ion channel or G-protein or (ii) a light-induced release of a caged ligand or enzymatic substrate, or (iii) any combination thereof. In some embodiments, the enzymatic substrate or salt thereof may be glutamate, calcium, nucleotide-phosphate, any salt thereof, or any combination thereof.

In some embodiments, the light-detectable sensor may comprise a sensor to detect a change in (i) a cell membrane potential, (ii) an intracellular concentration of an ion, (iii) a protein conformation, or (iv) any combination thereof. In some embodiments, the sensor may detect the change in the intracellular concentration of the ion. In some embodiments, the sensor may comprise fura-2, indo-1, fluo-3, fluo-4, fluo-5F, fluo-5N, Rhod-2, calcium green, calcium red, fura-Red, Quin-2, a salt of any of these, or any combination thereof. In some embodiments, the sensor may detect the change in cell membrane potential. In some embodiments, the sensor may comprise JC-1 iodide (CAS number 47729-63-5), JC-1 (CAS number 3520-43-2), di-3-ANEPPDHQ, di-4-ANEPPS (CAS number 90134-00-2), di-8-ANEPPS (CAS number 157134-53-7), DiBAC4(3) (CAS number 70363-83-6), BeRST, Di-4-ANBDQBS, VF2.1.Cl, RH237 (CAS number 83668-91-1), RH414 (CAS number 161433-30-3), RH421 (CAS number 107610-19-5), RH795 (CAS number 172807-13-5), a salt of any of these, or any combination thereof. In some embodiments, the sensor may detect the change in the intracellular concentration of the ion. In some embodiments, the ion may be a calcium ion, sodium ion, a potassium ion, a hydrogen ion, a chlorine ion, or any combination thereof.

In some embodiments, the plurality of wells may comprise a plurality of cells and a media. In some embodiments, at least a portion of the media may comprise a light-detectable sensor. In some embodiments, the system may detect a presence or an absence of activation of the light-detectable sensor within each well of the plurality of wells in a time period ranging from about 1 millisecond to about 1 minute. In some embodiments, the light-detectable sensor may comprise a sensor to detect a change in (i) a cell membrane potential, (ii) an extracellular concentration of an ion, (iii) a protein conformation, or (iv) any combination thereof.

In some embodiments, the plurality of cells may comprise spontaneously electrically active cells, optically-paced excitable cells, or a combination thereof. In some embodiments, the plurality of cells may comprise the spontaneously electrically active cells. In some embodiments, the spontaneously electrically active cells may comprise cardiomyocytes, cortical neurons, dorsal root ganglion neurons, or any combination thereof. In some embodiments, the plurality of cells may comprise the optically-paced excitable cells. In some embodiments, the optically-paced excitable cells may comprise ventricular myocytes, skeletal myocytes, or a combination thereof.

In some embodiments, the plurality of cells within each well of the plurality of wells may be from about 2 cells to about 50 cells. In some embodiments, the plurality of cells of each well of the plurality of wells may be less than about: 500 cells, 400 cells, 300 cells, 200 cells, 100 cells, 50 cells or less. In some embodiments, the plurality of cells within each well of the plurality of wells may be at least about 1,000 cells.

Another aspect of the present disclosure provides a kit. In some embodiments, the kit may comprise the system and instructions for use. In some embodiments, the kit may comprise a light-detectable sensor. In some embodiments, the kit may comprise a container. In some embodiments, the container may comprise a light-detectable sensor. In some embodiments, the kit may comprise a database. In some embodiments, the instructions for use may comprise instructions for human ether-a-go-go-related gene (hERG) screening. In some embodiments, the instructions for use may comprise instructions for screening a molecule or a salt thereof against an intact cardiomyocyte. In some embodiments, the instructions for use may comprise instructions for cardiomyocyte safety pharmacology screening. In some embodiments, a kit may comprise one or more light-detectable sensors and instructions for use of the light-detectable sensors with the system. In some embodiments, a kit may comprise an intact cardiomyocyte.

Another aspect of the present disclosure provides a method of making a kit. In some embodiments, the method may comprise combining the system and instructions for use. Another aspect of the present disclosure provides a method of making the system. In some embodiments, the method may comprise forming the illumination assembly and the detection assembly. Another aspect of the present disclosure provides a method of hERG screening. In some embodiments, the method may comprise performing a hERG screening employing the system. Another aspect of the present disclosure provides a method of screening a molecule or a salt thereof against intact cardiomyocytes. In some embodiments, the method may comprise screening the molecule or the salt thereof against the intact cardiomyocyte employing the system. Another aspect of the present disclosure provides a method of detecting a light-detectable sensor in a plurality of cells. In some embodiments, the method may comprise detecting the light-detectable sensor in the plurality of cells employing a system. Another aspect of the present disclosure provides a method of detecting a light-detectable sensor in a plurality of cells. In some embodiments, the method may comprise collecting a signal from a plurality of wells. In some embodiments, the collecting occurs substantially in parallel. In some embodiments, a sampling rate across the plurality of wells is greater than about 100 Hz.

Another aspect of the present disclosure provides a method of detecting a light-detectable sensor in a plurality of cells. In some embodiments, the method may comprise: providing an array of wells comprising a plurality of wells; directing a light from an excitation source to each well of the plurality of wells to illuminate at least a portion of each well of the plurality of wells to form an at least partially illuminated well; collecting a signal from each well of the plurality of wells; and transferring the signal from each well of the plurality of wells to a corresponding detector. In some embodiments, each well of the plurality of wells may comprise at least a cell of the plurality of cells. In some embodiments, the collecting may occur substantially in parallel. In some embodiments, a lens may be configured to focus at least a portion of the signal from each well onto a corresponding detector. In some embodiments, at least a portion of the plurality of cells may comprise the light-detectable sensor. In some embodiments, the signal may confirm a presence or an absence of activation of the light-detectable sensor. In some embodiments, the transferring may occur substantially in parallel. In some embodiments, a sampling rate across the plurality of wells may be greater than about 100 Hz.

Another aspect of the present disclosure provides a method of screening a biological activity of a molecule or salt thereof in a plurality of cells. In some embodiments, the method may comprise: adding the molecule or salt thereof to at least a portion of the plurality of wells; and detecting a presence or an absence of activation of a sensor within each well of the plurality of wells. In some embodiments, the sensor may comprise a light-detectable sensor. In some embodiments, the plurality of cells may comprise a cardiomyocyte. In some embodiments, each well of the plurality of wells may comprise at least a cell of the plurality of cells. In some embodiments, at least a portion of the plurality of cells may comprise the light-detectable sensor. In some embodiments, the detecting may occur substantially in parallel. In some embodiments, a sampling rate across the plurality of wells may be greater than about 100 Hz.

Another aspect of the present disclosure provides a system. In some embodiments, the system may comprise: an illumination assembly and a detection assembly. In some embodiments, the system may be configured to: direct light to a plurality of wells of an array of wells; collect, substantially in parallel, a signal from each well of the plurality of wells; and transfer each signal, substantially in parallel, to a corresponding detector. In some embodiments, a sampling rate of the signal across the plurality of wells may be greater than about 100 Hertz (Hz). Another aspect of the present disclosure provides a method of screening a biological activity of a molecule or salt thereof in a plurality of cells.

In some embodiments, the method may comprise: providing an array of wells comprising a plurality of wells; adding the molecule or salt thereof to at least a portion of the plurality of wells; directing a light from an excitation source to each well of the plurality of wells to illuminate at least a portion of each well of the plurality of wells to form an at least partially illuminated well; and detecting a presence or an absence of activation of the sensor within each well of the plurality of wells.

In some embodiments, each well of the plurality of wells may comprise a cell of the plurality of cells. In some embodiments, at least a portion of the plurality of cells may comprise a sensor. In some embodiments, the detecting may occur substantially in parallel. In some embodiments, a sampling rate across the plurality of wells may be greater than about 100 Hz. In some embodiments, the sensor may comprise a light-detectable sensor. In some embodiments, the plurality of cells may comprise a cardiomyocyte. In some embodiments, the plurality of wells may be the array of wells. In some embodiments, the array of wells may comprise 6 wells, 12 wells, 32 wells, 96 wells, or 384 wells.

Another aspect of the present disclosure provides a system. In some embodiments, the system may comprise an illumination assembly and a detection assembly. In some embodiments, the system may be configured to: direct light to a plurality of wells of an array of wells; collect, substantially in parallel, a signal from each well of the plurality of wells; and transfer each signal, substantially in parallel, to a corresponding detector. In some embodiments, the system may have a sampling rate of the signal across the plurality of wells that may be greater than about 100 Hertz (Hz). In some embodiments, collection and transfer of the signal from each well of the plurality of wells may occur simultaneously.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
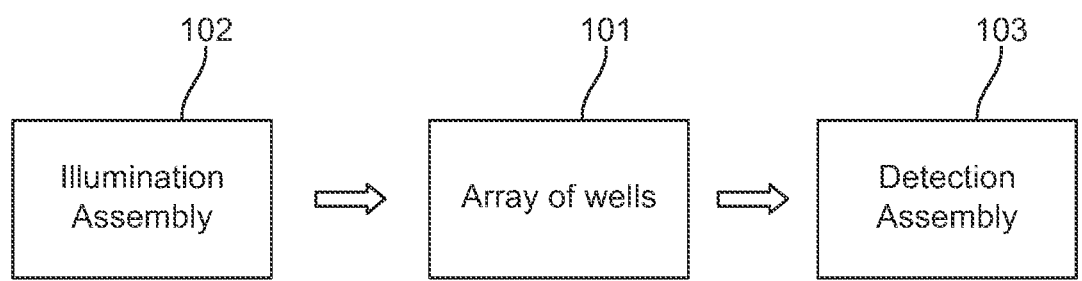
FIG. 1 shows a block diagram of the illumination assembly that directs a light from an excitation source to an array of wells from which a detection assembly is configured to capture and transfer data acquired from the illuminated areas.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein, the singular forms "a", "an", and "the" include plural references unless the context clearly dictates otherwise. Any reference to "or" herein is intended to encompass "and/or" unless otherwise stated.

As used herein, the term "about" means the referenced numeric indication plus or minus 15% of that referenced numeric indication.

The term "well" as used herein, generally refers to a well that is configured to receive one or more cells. A well may be configured to receive one cell. A well may be configured to receive a plurality of cells. The system may be configured to receive an array of wells, such as a microplate. The array of wells may comprise a plurality of wells. One or more wells of the plurality of wells may comprise a single cell type or more than one cell type. One or more wells of the plurality of wells may comprise a different cell type. One or more wells of the plurality of wells may comprise a different stimulus or condition (such as a different drug or different media composition). An array of wells may be a microplate, such as a custom manufactured microplate or a commercially available microplate. A system may comprise an array of wells. A system may be configured to receive an array of wells. A portion of a well may comprise glass, such as borosilicate glass. A portion of a well may comprise plastic, such as polypropylene, polyethylene, polyethylene terephthalate G, polymethylpentene or others.

The term "cell" as used herein, generally refers to a cell that may be added to one or more wells of the plurality of wells of the system described herein. A cell may comprise a cell line, such as a human embryonic kidney cell 293 (HEK293 cell). A cell may be an engineered or genetically modified cell. In some cases, an engineered or genetically modified cell may be altered to express a light-gated ion channel, a voltage-gated channel, ligand-gated ion channel, mechanosensitive ion channel, a temperature-gated ion channel, or any combination thereof. A cell may be isolated from a subject, such as a surgical biopsy, a surgical resection, a needle aspirate, a blood sample, or a combination thereof taken from the subject. A cell may be isolated from a tissue or bodily fluid such as phlegm, saliva, blood, urine, or a combination thereof. A cell may be isolated from a subject having a condition or suspected of having a condition, such as a heart condition. A cell may be a stem cell, a neuron, a myocyte (such as a cardiomyocyte), or combinations thereof. A cell may be an electrically active cell such as a cardiomyocyte or neuron (such as cortical neuron or dorsal root ganglion neurons). A cell may be an optically-paced excitable cell such as a cardiomyocyte (such as a genetically modified cardiomyocyte), neuron (such as cortical neuron or dorsal root ganglion neuron), ventricular myocyte, or skeletal myocyte. In some embodiments, one or more cell types may be co-cultured together such as an electrically active cell and a cell that supports the electrically activity of the electrically active cell. For example, in some cases, cardiomyocytes and HEK293 cells may be co-cultured together in a single well.

The term "light" as used herein, generally refers to the electromagnetic radiation provided by one or more excitation sources. The one or more excitation sources may be provided as part of the system or may be separate from the system, such as an external excitation source that may be operatively coupled to the system. The light provided by one or more excitation sources may be directed to a plurality of wells to illuminate at least a portion of each well of the plurality of wells. The light may be provided at a specific wavelength or within a range of specific wavelengths. For example, an excitation source may provide a light with a wavelength of about 400 nanometers (nm) to about 450 nm to a well of a plurality of wells. An excitation source may provide a light with a wavelength from about 400 nm to about 1000 nm to a well of the plurality of wells. The light may be a time constant or a time varying light, such as a pulsed light. A light intensity of the light may be time constant or time varying, such as an adjustable light intensity. An adjustable light intensity may be adjusted by a controller of the system or by a user. A light provided by an excitation source may provide an excitation wavelength to excite a light-detectable sensor such that a signal may be collected from the light-detectable sensor at a detectable or emission wavelength. The signal may be a light signal that may be converted to an electrical current, when the detection assembly comprises a photodiode. A light may be a visible light, an infrared light, a fluorescent light, a luminescent light, a phosphorescent light, or any combination thereof.

The term "at least partially illuminated well" as used herein, generally refers to a well of a plurality of wells configured to receive a light from an excitation source. The light may be directed from an excitation source to each well of the plurality of wells to illuminate at least a portion of each well. In some cases, the light illuminates substantially an entire surface area of the well upon which a cell or a plurality of cells rest. In some cases, the light illuminates a portion of a surface area of the well upon which a cell or a plurality of cells rest. In some cases, the light illuminated a portion of cells of the plurality of cells within a well. In some cases, the light illuminates each cell with a well. In some cases, the light may illuminate a surface area of the well that may be from about 0.1 millimeters² (mm) to about 20 mm². A light may illuminate a surface area of the well that may be from about 0.1 mm² to about 10 mm². A light may illuminate a surface area of the well that may be from about 0.1 mm² to about 5 mm². A light may illuminate a surface area of the well that may be from about 0.5 mm² to about 10 mm². A light may illuminate a surface area of a well than may be from about 0.5 mm² to about 8 mm².

The term "signal" as used herein, generally refers to a signal that may be collected by a detection assembly of the system. A signal may be a spontaneous signal. A signal may be a signal mounted in response to a specific or defined stimulus. A signal may be intermittent. A signal may be continuous. A signal may follow a stimulus or input. The detection assembly may comprise a collection optic. A detection assembly may comprise a photodiode. A signal may be a light signal. A signal may be a signal that may be converted to an electrical signal. A signal may be a light signal that may be converted to an electrical signal by a detection assembly, such as a photodiode. A signal may be a light signal emitted by a light-detectable sensor. A signal may be a fluorescence signal, a phosphorescence signal, a luminescence signal, or any combination thereof. A signal may be indicative of a biological response, such as a change in an action potential, a refractory period following an action potential, a membrane depolarization, a partial membrane depolarization, a membrane potential or intracellular ion concentration.

The term "transmission geometry" as used herein, generally refers to a position of the detection assembly relative to an incoming path of light. For example, the incoming path of light (such as a light from an excitation source) may be positioned to be approximately orthogonal to a surface of a well of a plurality of wells (such as a bottom surface). The incoming light that may not absorbed by a sample in the well (such as a cell at a bottom of a well) may be "transmitted" through the sample along a path that may be approximately orthogonal to the surface of a well of a plurality of wells. In some cases, the detection assembly may be positioned to collect a signal from the sample along an axis substantially parallel to an incoming path of transmitted light such that the configuration may comprise a transmission geometry.

The term "excitation source" as used herein, generally refers to an excitation source which may provide light to the system. An excitation source may be a light source. An excitation source may be a laser, a light-emitting diode (LED) lamp, a flash lamp, a mercury vapor lamp, a xenon arc lamp, a tungsten-halogen or lamp. A system may comprise one or more excitation sources, such as two excitation sources. The two excitation sources may be the same, such as two lasers. The two excitation sources may be different, such as a laser and an LED lamp. The excitation source may provide light to at least a portion of each well of a plurality of wells. The excitation source may excite or activate a light-detectable sensor such that the light-detectable sensor emits a signal that may be collected with a detection assembly of the system. The excitation source may provide an excitation wavelength to excite a light-detectable sensor and a detection assembly may collect a signal emitted from the light-detectable sensor at an emission wavelength. For example, an excitation source may provide an excitation wavelength of about 400 to about 450 nanometers to a plurality of wells and the detection assembly may collect a signal emitted from the light-detectable sensor at an emission wavelength of about 600 to about 700 nanometers. A detection assembly may collect as signal at an emission wavelength of about 400 to about 1000 nanometers. A detection assembly may collect as signal at an emission wavelength of about 400 to about 800 nanometers. A detection assembly may collect as signal at an emission wavelength of about 500 to about 1000 nanometers. A detection assembly may collect as signal at an emission wavelength of about 600 to about 1000 nanometers. An excitation source may provide an excitation wavelength of about: 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, or 900 nm. An excitation source may provide an excitation wavelength from about 600 nm to about 700 nm. An excitation source may provide an excitation wavelength from about 610 nm to about 680 nm. An excitation source may provide an excitation wavelength from about 620 nm to about 660 nm. A signal emitted from a light-detectable sensor may be collect by a detection assembly at an emission wavelength of about: 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, or 900 nm. A signal may be collected by a detection assembly at an emission wavelength from about 600 nm to about 900 nm. A signal may be collected by a detection assembly at an emission wavelength from about 620 nm to about 880 nm. A signal may be collected by a detection assembly at an emission wavelength from about 650 nm to about 850 nm. In some cases, the detection assembly may comprise a photodiode that converts a light signal to an electrical current signal.

The term "light-detectable sensor" as used herein, generally refers to a light-detectable sensor that may be added to a well or to a cell. A cell may comprise a light-detectable sensor. A media within a well may comprises a light-detectable sensor. A light-detectable sensor may be detected by collecting a light emitted by the light-detectable sensor at an emission wavelength by a detection assembly of the system. A light-detectable sensor may be a fluorescent sensor, a luminescent sensor, a phosphorescent sensor, or any combination thereof. A light-detectable sensor may detect light within a wavelength range such as a near-infrared sensor, a panchromatic sensor, a blue-green sensor, an ultraviolet sensor, or combinations thereof. A light-detectable sensor may detect light within a wavelength range such as from about 800 nm to about 1000 nm; from about 700 nm to about 900 nm; from about 600 nm to about 800 nm; from about 500 nm to about 700 nm; from about 400 nm to about 600 nm; or any combination thereof. A light-detectable sensor may comprise a sensor that may detect one or more properties of a cell. For example, a light-detectable sensor may comprise a sensor that detects a change in a cell membrane potential, an intracellular ion concentration, a protein conformation, or any combination thereof.

The term "ion" as used herein, generally refers to any positively charged or negatively charged atom or molecule. In some cases, an ion may be an intracellular or extracellular ion. An ion may comprise a calcium ion, a sodium ion, a potassium ion, a hydrogen ion, a chlorine ion, a magnesium ion, an iron ion, a manganese ion, a biocarbonate ion, or any combination thereof. An ion may comprise any ion that may flux into and/or out of a cell through, for example, an ion channel.

The term "molecule" as used herein, generally refers to any peptide, amino acid, small molecule or any other structure that comprises at least two atoms that are linked together by a chemical bond. A molecule may be a drug or investigational drug. A molecule may be a therapeutic compound used to treat a subject having a condition. A molecule may be a therapeutic compound under evaluation for treating a subject having a condition.

The term "sequence homology," as used herein, generally refers to calculations of "homology" or "percent homology" between two or more nucleotide or amino acid sequences that can be determined by aligning the sequences for optimal comparison purposes (e.g., gaps can be introduced in the sequence of a first sequence). The nucleotides at corresponding positions are then compared, and the percent identity between the two sequences may be a function of the number of identical positions shared by the sequences (i.e., % homology=# of identical positions/total # of positions×100). For example, a position in the first sequence may be occupied by the same nucleotide as the corresponding position in the second sequence, then the molecules are identical at that position. The percent sequence homology between the two sequences may be a function of the number of identical positions shared by the sequences, taking into account the number of gaps, and the length of each gap, which need to be introduced for optimal alignment of the two sequences. In some embodiments, the sequence length of a sequence aligned for comparison purposes may be at least about 30%, at least about 40%, at least about 50%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, or at least about 95%, of the sequence length of the reference sequence. A BLAST® search may determine homology between two sequences. The two sequences can be genes, nucleotides sequences, protein sequences, peptide sequences, amino acid sequences, or fragments thereof. The actual comparison of the two sequences can be accomplished by well-known methods, for example, using a mathematical algorithm. A non-limiting example of such a mathematical algorithm may be described in Karlin, S. and Altschul, S., Proc. Natl. Acad. Sci. USA, 90-5873-5877 (1993). Such an algorithm may be incorporated into the NBLAST and XBLAST programs (version 2.0), as described in Altschul, S. et al., Nucleic Acids Res., 25:3389-3402 (1997). When utilizing BLAST and Gapped BLAST programs, any relevant parameters of the respective programs (e.g., NBLAST) can be used. For example, parameters for sequence comparison can be set at score=100, word length=12, or can be varied (e.g., W=5 or W=20). Other examples include the algorithm of Myers and Miller, CABIOS (1989), ADVANCE, ADAM, BLAT, and FASTA. In another embodiment, the percent identity between two amino acid sequences can be accomplished using, for example, the GAP program in the GCG software package (Accelrys, Cambridge, UK).

Advantages of the systems, devices, and methods as described herein may include substantially parallel or simultaneous multiwall acquisition of signals, such as cellular signals. This benefit may be achieved in part by the transmission geometry of the system which provides transmitted light or diascopic transmission fluorescence to a plurality of wells or samples within an array. Systems lacking this structural feature of transmission geometry may lack sufficient illumination intensity necessary for multiwall acquisition. Other benefits provided by the systems, devices, and methods as described herein may include (a) achieving repetitive stimulation and response signal monitoring across multiple wells substantially in parallel or simultaneously for a sustained period of time; (b) achieving accurate recording of signals having short response times (such as sub-millisecond scale perturbations) across multiple wells substantially in parallel or simultaneously; and (c) combining fast response probes with fast sampling rates on multiple wells substantially in parallel or simultaneously at a low signal to noise ratio. Prior systems may either (a) be configured to measure one sample at a time with a high sampling rate and acceptable signal to noise ratio or (b) be configured to measure multiple samples with slowly-responsive probes or slow sampling rates, but these prior systems may fail to achieve both features. In contrast, the systems, devices, and methods described herein can achieve both.

Figure 5:
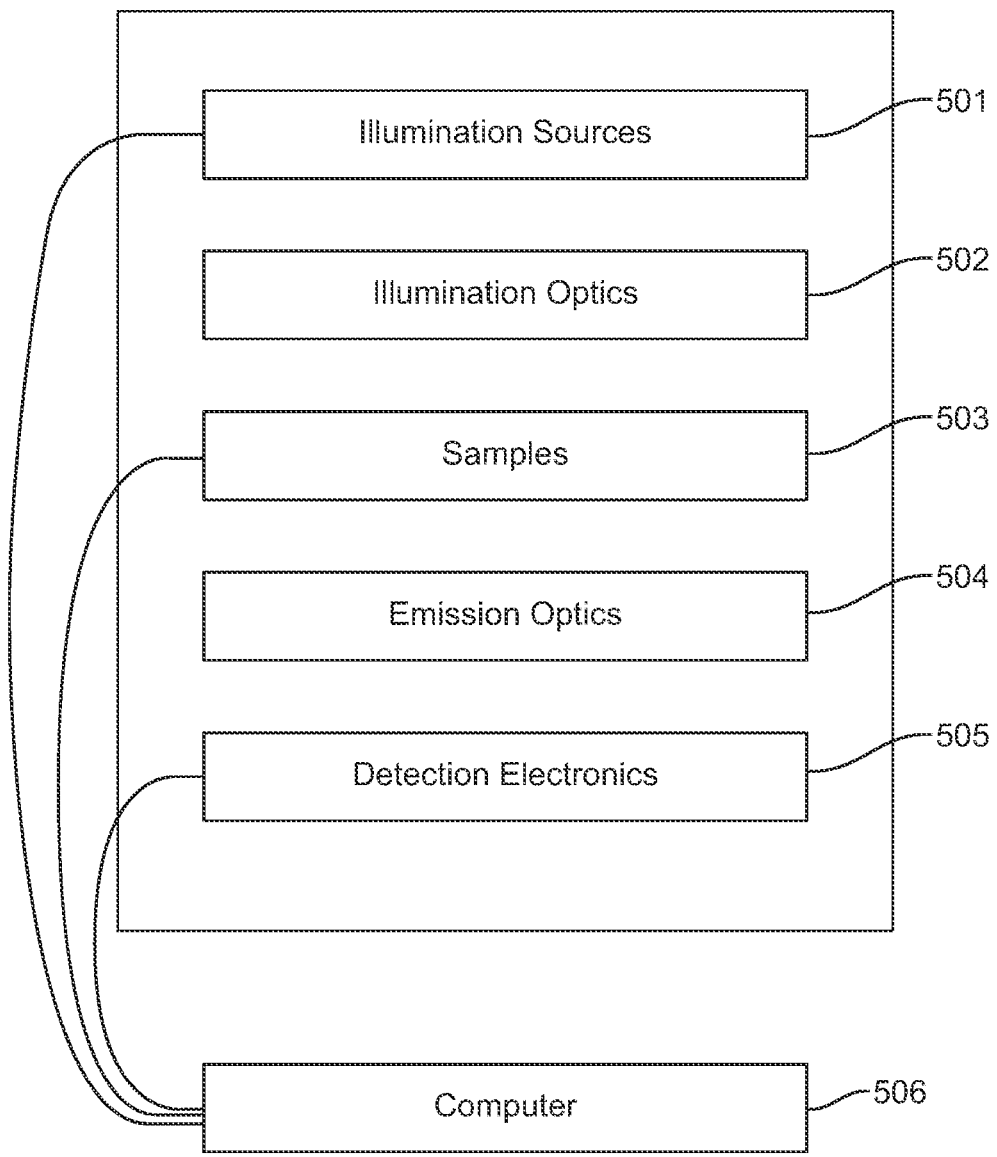
FIG. 5 shows a system setup.

As shown in FIG. 1, systems as described herein may comprise an illumination assembly 102, an array of wells 101, and a detection assembly 103. The illumination assembly may comprise one or more illumination sources 501 as shown in FIG. 5, one or more illumination optics 502. Light from an illumination assembly may be directed to one or more samples 503. In some cases, a sample may comprise one or more cells. The system may also comprise emission optics 504 and detection electronics 505 to collect a signal that may be emitted from a sample. A computer 506 may be operatively connected to one or more system elements, such as the illumination source 501, the one or more samples 503, the detection electronics 505, or any combination thereof.

An illumination assembly may comprise one or more excitation sources. In some cases, an external excitation source may be operatively coupled to the system. An illumination assembly may be configured to direct light from an excitation source to a well of an array of wells or to a plurality of wells of an array of wells or to a portion of a microplate. Each well of the plurality of wells may be configured to receive one or more cells. The light may be directed from an excitation source to at least a well of the array of wells. The light may illuminate at least a portion of the well to form an at least partially illuminated well. The light may fully illuminate the well. The light may be directed to illuminate at least a portion of each well of a plurality of wells, which may occur in parallel. The light may be directed to illuminate at least a portion of cells received into a well. The light may be directed to illuminate each cell received into a well or at least about: 50%, 60%, 70%, 80%, or 90% of the cells received into a well. The light may be directed to illuminate at least about 60% of the cells received into a well. The light may be directed to illuminate at least about 70% of the cells received into a well. The light may be directed to illuminate at least about 80% of the cells received into a well. The light may be directed to illuminate at least about 90% of the cells received into a well. The light may be directed to illuminate at least about 95% of the cells received into a well. The light may be directed to illuminate at least a portion of cells received into each well of the plurality of wells in parallel, such that illuminated cells within different wells are illuminated in parallel.

A detection assembly may comprise one or more detectors. A detector may be an optical detector. A detector may be a photodiode. A detector may be a photomultiplier tube (PMT). A detection assembly may comprise one or more photodiodes, photomultiplier tubes, CCD cameras, or a combination thereof. A detection assembly may comprise a corresponding detector for each well of the plurality of wells. A detection assembly may be configured to collect and transfer a signal to the one or more detectors. A detection assembly may collect a signal from a portion of a well that may be illuminated. A detection assembly may collect a signal from a portion of cells received into a well. The signal may be collected from a portion of cells that may be illuminated by at excitation source. The signal may be a light signal, such as a fluorescence signal. The signal may be converted, such as converting a light signal to an electrical current signal. The conversion may be performed by the detector, such as a photodiode. Collection of a signal from each well of the plurality of wells may occur in parallel, such as collecting a signal from 384 wells in parallel. A temporal resolution of the detection assembly, such as the collection and transfer, across a plurality of wells of the array of wells may be greater than about: 100 Hertz (Hz), 1,000 Hz, 10,000 Hz, 20,000 Hz, or greater.

Properties of a light provided by an excitation source may be adjustable. For example, an intensity of a light may be adjustable. A wavelength of a light may be adjustable. A temporal pattern of the light may be adjustable, such as a constant light or a timed pulsed light. A user may adjust a property of the light, such as the intensity. A controller of the system may direct the adjusting of a property of the light. A property of the light may be adjusted in response to a feedback signal, such as an adjustment to a wavelength to properly excite a light-detectable sensor in a well. A property of the light may be adjusted in response to a particular assay that may be executed employing the system. Adjusting a property of the light, such as an intensity, may result in a response lag of less than about 1 millisecond. A response lag may be less than about 10 millisecond. A response lag may be less than about 5 millisecond. A response lag may be less than about 2 millisecond. A response lag may be less than about 1 millisecond. A response lag may be less than about 0.75 millisecond. A response lag may be less than about 0.5 millisecond. A response lag may be less than about 0.25 millisecond. A response lag may be less than about 0.1 millisecond.

An excitation source may provide a light intensity to each well of a plurality of wells. For example, each well of a plurality of wells may receive a light intensity of about 5 milliWatts per square millimeter ($mW/mm^2$). Each well of a plurality of wells may receive a light intensity of at least about 5 $mW/mm^2$. Each well of a plurality of wells may receive a light intensity that does not vary in magnitude across the plurality of wells by more than about: 1%, 2%, 3%, 4%, 5%, 6%, 7%, 8%, 9%, 10%, 15%, or 20%.

A detection assembly may be configured to collect a signal, such as a light signal, and direct the signal onto a corresponding detector. In each well of the plurality of wells, a detection assembly may be configured to collect a signal and direct at least a portion of the signal onto a corresponding detector. The detection assembly may be configured to collect a signal and direct at least about: 90%, 95%, 96%, 97%, 98%, or 99% of the signal onto a corresponding detector. A detector may be a photodiode. In some cases a photodiode detector may comprise a p-i-n (PIN) photodiode, a p-n (PN) photodiode, an Avalanche photodiode, a Schottky photodiode, or any combination thereof. A detector, such as a photodiode, may be configured to collect a signal such as a light signal that may comprise a fluorescence signal, a phosphorescence signal, a luminescence signal, or any combination thereof.

The systems described herein may be configured to receive an array of wells, such as a microplate. An array of wells may comprise a plurality of wells. The plurality of wells may comprise at least about: 1 well, 6 wells, 16 wells, 32 wells, 96 wells, 384 wells, or more. A well may be configured to receive one or more cells. Each well of the plurality of wells may be configured to receive one or more cells. In some cases, at least a portion of a plurality of wells may comprise a light-detectable sensor, such as an extracellular light-detectable sensor or a light-detectable sensor in a liquid medium. In some cases, at least a portion of a plurality of cells may comprise a light-detectable sensor.

A system described herein may be configured to detect a presence or an absence of an activation of the light-detectable sensor. A light-detectable sensor may comprise a sensor to detect a change in (i) a cell membrane potential, (ii) an intracellular ion concentration, (iii) a protein conformation, or (iv) any combination thereof. A sensor may detect a change in intracellular ion concentration. A sensor may comprise fura-2, indo-1, fluo-3, fluo-4, fluo-5F, fluo-5N, Rhod-2, calcium green, calcium red, furaRed, Quin-2, any salt thereof, or a combination thereof. A sensor may detect a change in a cell membrane potential. A sensor may comprise JC-1 iodide (CAS number 47729-63-5), JC-1 (CAS number 3520-43-2), di-3-ANEPPDHQ, di-4-ANEPPS (CAS number 90134-00-2), di-8-ANEPPS (CAS number 157134-53-7), $DiBAC_4(3)$ (CAS number 70363-83-6), BeRST, Di-4-ANBDQBS, VF2.1.Cl, RH237 (CAS number 83668-91-1), RH414 (CAS number 161433-30-3), RH421 (CAS number 107610-19-5), RH795 (CAS number 172807-13-5), any salt thereof, or any combination thereof. A sensor may detect a change in an intracellular ion concentration. A sensor may detect a calcium ion, a sodium ion, a potassium ion, a hydrogen ion, a chlorine ion, or any combination thereof. A sensor may be a genetically encoded sensor. A genetically encoded sensor may detect a biological response, such as a change in a membrane potential, a change in an intracellular ion concentration, a change in a protein conformation, or any combination thereof.

A light-detectable sensor may be within a cell or on a surface of a cell. A light-detectable sensor may be within a medium that a cell may be cultured in. A presence or an absence of the activation of a light-detectable sensor may be indicative of a biological response, such as an ion flux or change in a membrane potential. The system may be configured to detect a presence or an absence of an activation of the light-detectable sensor in each well of the plurality of wells in parallel. The system may be configured to detect a presence or an absence of the activation of the light-detectable sensor in each well of the plurality of wells from about 1 millisecond to about 1 minute. The system may detect the presence or absence across the plurality of wells in less than about: 1 minute, 100 millisecond, 10 millisecond, 1 millisecond, or less. In some cases, the system may be configured to detect a change in an intensity of the light-detectable sensor simultaneously with each well of the plurality of wells in less than about a millisecond with a signal to noise ratio in excess of about: 5/10 millivolts (mV) cell membrane potential change, 10/10 mV cell membrane potential change, 15/10 mV cell membrane potential change, 20/10 mV cell membrane potential change, 25/10 mV cell membrane potential change, or 50/10 mV cell membrane potential change or more.

A light from an excitation source may comprise a constant light, a timed pulse of light, or a combination thereof. A timed pulse of light may be less than about 100 millisecond in duration. A timed pulse of light may be less than about 10 millisecond in duration. A timed pulse of light may be less than about 1 millisecond in duration. A timed pulse of light may be less than about 1000 millisecond in duration. A timed pulse of light may be from about 10 millisecond in duration to about 100 millisecond in duration. A timed pulse of light may be from about 50 millisecond in duration to about 100 millisecond in duration. A timed pulse of light may comprise one or more wavelengths. The one or more wavelengths of the timed pulse of light may be the same wavelength or may be different wavelengths, such as at least two different wavelengths, at least three different wavelengths, or more.

A plurality of cells may comprise spontaneously electrically active cells, optically-paced excitable cells, or a combination thereof. A plurality of cells may comprise cell lines or primary cells. A plurality of cells may comprise cells obtained from a subject. A plurality of cells may comprise cells obtained from a biological sample obtained from a subject. A plurality of cells may comprise cells obtained from a cell bank, a tissue bank, or other collective bank. Spontaneously electrically active cells may comprise cardiomyocytes, cortical neurons, dorsal root ganglion neurons, or any combination thereof. Optically-paced excitable cells may comprise ventricular myocytes, skeletal myocytes, or a combination thereof.

A system described herein may comprise one or more filters, such as an emission filter. A filter may be configured to permit the detection assembly to collect a signal and to filter out a light from an excitation source. A system may comprise one or more lens, such as a focusing lens, a single collimation lens, or a combination thereof. A lens may be configured to direct a signal onto a detector. A lens may be configured to direct a light from an excitation source onto at least a portion of a well. A system may comprise one or more amplifiers. A amplifier may comprise an on-board transimpedance amplifier.

Kits may comprise a system as described herein and instructions for use. A kit may comprise a system as described herein. A kit may comprise a system and reagents and/or instruction for use necessary for i) hERG screening, ii) screening a molecule against an intact cardiomyocyte, iii) cardiomyocyte safety pharmacology screening, or iv) combination thereof. A kit may comprise one or more light-detectable sensors and instructions for use.

A method may comprise a method of making a kit or a method of making the system. A method may comprise a method of hERG screening employing the system as described herein. A method may comprise a method for screening a molecule against intact cardiomyocytes employing the system as described herein.

A method may comprise a method of detecting a light-detectable sensor in a plurality of cells. The method may comprise providing an array of wells comprising a plurality of wells. Each well of the plurality of wells may comprise one or more cells. The cell may comprise a light-detectable sensor. In some cases, at least a portion of the one or more cells may comprise a light-detectable sensor. A light may be directed from an excitation source to each well of the plurality of wells to illuminate at least a portion of each well of the plurality of wells to form an at least partially illuminated well. A signal may be collected from each well of the plurality of wells in parallel and the signal may be transferred to a corresponding detector in parallel. Each signal of the plurality of signals may confirm a presence or an absence of activation of a light-detectable sensor.

A method may comprise a method of screening a biological activity of a molecule or salt thereof in a plurality of cells. The method may comprise providing an array of wells comprising a plurality of wells. Each well of the plurality of wells may comprise one or more cells. A molecule or salt thereof may be added to at least a portion of the plurality of wells. Light may be directed from an excitation source to each well of the plurality of wells to illuminate at least a portion of each well. A presence or an absence of activation of the light-detectable sensor may be detected within each well of the plurality of wells in parallel.

Systems as described herein may combine fast responding probes or light-detectable sensors with fast sampling rates to collect signals from a plurality of samples in parallel with a high signal-to-noise ratio (SNR) For example, a light-detectable sensor may comprise a response time constant of less than about 1 millisecond. In some cases, a response time constant may be less than about 100 microseconds. In such cases, a system may measure a change in the light-detectable sensor within each well of a plurality of wells in parallel. The parallel measurement across the plurality of wells may occur in less than about 1 millisecond. The parallel measurement across the plurality of wells may occur in less than about 100 microseconds. An SNR of the system may be in excess of about 5/10 mV cell membrane potential change, or in excess of about 25/10 mV cell membrane potential change, or in excess of about 50/10 mV cell membrane potential change. In some cases, the system may trigger a monitorable change in a cell membrane potential. For example, a system may produce a plurality of timed pulses of light from an excitation source. The plurality of timed pulses of light may comprise a same or different wavelength to excite a light-detectable sensor. A timed pulse of light may be less than about 100 millisecond, less than about 75 millisecond, less than about 50 millisecond, less than about 25 millisecond, less than about 10 millisecond, or less than about 5 millisecond. A light-gated actuator protein may trigger monitorable changes in a cell membrane potential. A light-gated actuator protein may be employed alone or in combination with a plurality of timed pulses of light to trigger monitorable changes in a cell membrane potential. A light-gated actuator protein may comprise a *Chlamydomonas* Chop1, a *Chlamydomonas* Chop2 or an expressed protein having at least about 52% sequence homology, about 52% sequence length, or a combination thereof with Chop1 or Chop2. A light-gated actuator protein may comprise a Light-gated Glutamate Receptor (LiGluR).

A signal may be collected from a region of an array of wells that comprises a plurality of cells. For example, a region may be an individual well comprising a plurality of cells. A signal may be collected from a plurality of wells (such as 16 wells, 96 wells, 384 wells) simultaneously or in parallel.

The system may comprise an illumination system that comprises one or more excitation sources. The system may be operatively connected to an external excitation source. An intensity of the excitation source may be adjustable by a user or by a controller of the system. A lag time in adjusting an intensity of an excitation source from a first intensity to a second intensity may be less than about 10 milliseconds. A lag time may be less than about 1 millisecond. An excitation source may provide a same intensity to each well of a plurality of wells. An excitation source may provide a similar intensity to each well of a plurality of wells, such as for example an intensity that varies by less than 10% across the plurality of wells. An excitation source may provide an intensity to each well of a plurality of wells that may greater than about: 1 $mW/mm^2$, 5 $mW/mm^2$ or 10 $mW/mm^2$.

In some cases, the system may comprise one or more optics. The system may comprise one or more excitation optics, one or more collection optics, or a combination thereof. The excitation optics may be configured to direct a light from an excitation source to a plurality of wells of the system. The collection optics may be configured to collect a signal, such as collecting a signal from a plurality of wells, in some cases, collecting in parallel. In some cases, a focal length of the excitation optics into a well may be longer than a focal length of the signal collection optics collecting a signal from a well. A focal length of the excitation optics may be about: 1%, 5%, 10%, or 20% longer than the focal length of the signal collection optics. A focal length of the excitation optics may be at least about: 1%, 5%, 10%, or 20% longer than the focal length of the signal collection optics. A focal length of the excitation optics may be the same as a focal length of the signal collection optics. A focal length of the signal collection optics may be longer than a focal length of the excitation optics. A focal length of the signal collection optics may be about: 1%, 5%, 10%, or 20% longer than the focal length of the excitation optics. A focal length of the signal collection optics may be at least about: 1%, 5%, 10%, or 20% longer than the focal length of the excitation optics.

Figure 2:
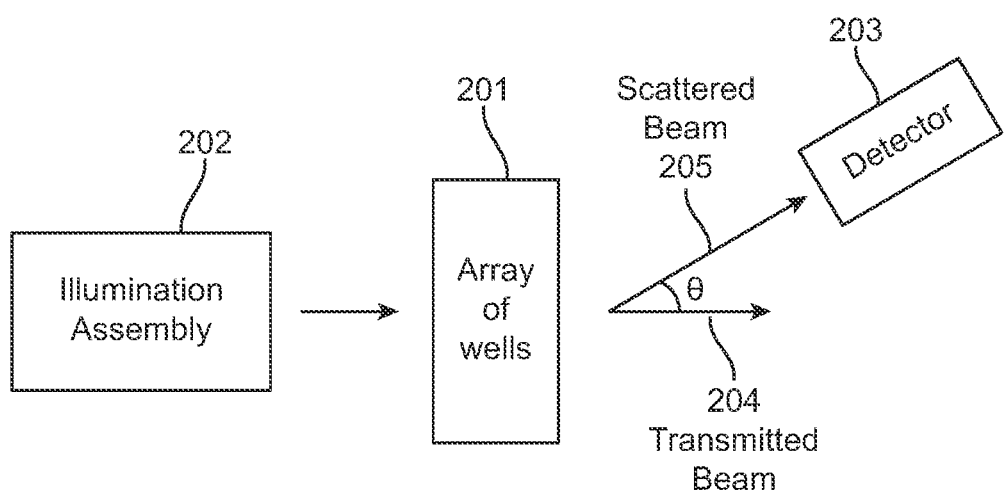
FIG. 2 shows an example of fluorescence transmission geometry.

The system may be configured to collect a signal from a plurality of wells of the system. The signal may be a light signal, such as a fluorescence signal, a phosphorescence signal, a luminescence signal, a visible signal, or any combination thereof. A light signal may be converted to an electrical current signal by a detector of the system, such as a photodiode. The system may be configured such that the signal may be collected in transmission geometry. For example, as shown in FIG. 2, an illumination assembly 202 may direct a light from an excitation source to an array of wells 201. A plurality of wells of the array of wells may be configured to receive a plurality of cells. A portion of the light that may pass through the plurality of wells may be a transmitted beam 204. A portion of the light that may pass through the plurality of wells may be a scattered beam 205. A system may comprise a detector 203 to collect a portion of the scattered beam 205. An angle, θ, between the scattered beam 205 and the transmitted beam 204 may be about θ=0. The angle, θ, may be θ=to about 1, 2, 3, 4, 5, 6, 7, 8, 9, 10, 11, 12, 13, 14, or 15. The angle, θ, may be θ=to about 5. The angle, θ, may be θ=to about 10. The angle, θ, may be θ=to about 15. The angle, θ, may be less than about 5. The angle, θ, may be less than about 4. The angle, θ, may be less than about 3. The angle, θ, may be less than about 2. The angle, θ, may be less than about 1.

In some cases, such as when the angle, θ=0, the excitation light may be collected by the detection assembly. In some cases, the excitation light may not be collected by the detection assembly. In some cases, a portion of the excitation light may be collected by the detection assembly. In some cases, the excitation light may also be filtered out, such that the signal may be detected but not the excitation light. In some cases, a portion of the excitation light may be collected by the detection assembly. In some cases, the excitation light may be collected by the detection assembly. In some cases, altering the angle θ may also alter the portion of the excitation light that may be collected by the detection assembly. The system may comprise one or more filters that may filter out a portion of the excitation light that may be collected by the detection assembly. A filter may filter out a portion of the excitation light. A filter may filter out the excitation light. A filter may filter out the excitation light such that a detector (i.e. photodiode) converts a light signal to an electrical current signal, and does not convert an excitation light.

The system may comprise optics, such as a detection assembly comprising collection optics configured to collect a signal. The system may comprise optics such as an illumination assembly comprising excitation optics configured to direct a light to a plurality of wells. In some cases, the system may comprise a combination of collection optics and excitation optics. A numerical aperture of an optics may be adjustable. A system may be configured to interchange one or more optics having different numerical apertures. A larger numerical aperture may permit a larger amount of signal to be collected onto a detector. For example, an optic comprising a numerical aperture of 0.8 may collect a larger amount of a signal than an optic comprising a numerical aperture of 0.2. A numerical aperture of an optics, such as a signal collection optics, may be about 0.2. A numerical aperture of an optics may be about 0.3. A numerical aperture of an optics may be about 0.4. A numerical aperture of an optics may be about 0.5. A numerical aperture of an optics may be about 0.6. A numerical aperture of an optics may be about 0.7. A numerical aperture of an optics may be about 0.8. A numerical aperture of an optics may be from about 0.2 to about 0.8. A numerical aperture of an optics may be from about 0.3 to about 0.7. A numerical aperture of an optics may be from about 0.4 to about 0.6. A numerical aperture of an optics may be from about 0.3 to about 0.8. A numerical aperture of an optics may be from about 0.2 to about 0.7.

A collection optics of the system may be configured to collect a signal, such as a light signal (i.e. fluorescence signal) onto a corresponding detector, such as a photodiode. The detector, such as the photodiode may convert the light signal into an electrical current signal. A collection optics may collect a signal from an area of a well of the plurality of wells. An area collected from a collection optics may be about: 0.5, 1, 5, 10, 15, 20, 25, 30, 35, 40, 45, 50, 60, 70, 80, 90, 100, 200, 300, 400, or 500 $mm^2$.

In some cases, it may be advantageous to minimize a collection area of a detector. Minimizing a collection area of a detector may minimize noise in the system. A diameter of a collection area of a detector may be about: 0.5, 0.75, 1.0, 1.25, 1.5, 1.75, 2.0, 2.25, 2.5, 2.75, 3.0, 3.5, or 4.0 mm. A diameter of a collection area of a detector may be less than about: 0.5, 0.75, 1.0, 1.25, 1.5, 1.75, 2.0, 2.25, 2.5, 2.75, 3.0, 3.5, or 4.0 mm. A diameter of a well of the plurality of wells may be about: 0.5, 0.75, 1.0, 1.25, 1.5, 1.75, 2.0, 2.25, 2.5, 2.75, 3.0, 3.5, 4.0 mm, or more. A diameter of a well of the plurality of wells may be less than about: 0.5, 0.75, 1.0, 1.25, 1.5, 1.75, 2.0, 2.25, 2.5, 2.75, 3.0, 3.5, 4.0 mm, or more. A diameter of a collection area of a detector may be equal to a diameter of a well, for example both diameters may be about 2.0 mm. A diameter of a collection area of a detector may be less than a diameter of a well. For example, a diameter of a well may be about 3.0 mm and a diameter of a collection area may be about 2.0 mm. A diameter of a collection area of a detector may be greater than a diameter of a well. For example, a diameter of a well may be about 1.0 mm and a diameter of a collection area may be about 2.0 mm. The system may be configured to provide a magnification of a collection optics such that a ratio of an area of a well from which the signal is collected to an area of a signal that may be transferred onto a collection area of a detector may be about 1:1.

A ratio may be an area of a well (such as a bottom surface of a well) from which a signal may be collected to the area to which the signal may be transferred onto a detector. The ratio may be 1:1. The ratio may be from 1:0.5 to about 1:1.5.

A ratio may be a portion of light that may illuminate a well to a portion of a signal that may be collected from the well. The ratio may be about 1:1. The ratio may be from about 1:0.5 to about 1:1.5.

A ratio may be a portion of a well of a plurality of wells that may be illuminated to a portion of the well from which a signal may be collected and transferred onto a detector. The ratio may be about 1 1. The ratio may be from about 1:0.5 to about 1:1.5.

The portion of the well that may be illuminated may comprise at least about: 1, 10, 50, 100, 500, 1000, 2000 cells or more. The portion of the well from which a signal may be collected may comprise at least about: 1, 10, 50, 100, 500, 1000, 2000 cells or more. An active portion of a corresponding detector may be equal to an illuminated portion of a well. An active portion of a corresponding detector may be similar to an illuminated portion of a well.

An advantage of the systems described herein may provide for efficient collection and detection of a signal, such as a fluorescence signal or a signal from a light-detectable sensor. A system may comprise one or more lenses. A detection assembly of the system may comprise one or more lenses, such as a collection lens. A collection lens of the system described herein may comprise a diameter of about 6 millimeters and a focal length of about 6 millimeters. One or more lenses may be positioned by or operatively coupled to a machined plate. In some cases, decreasing the focal length of a lens may increase the fraction of the signal that may be collected by the lens. In some cases, the fraction may be given by:

Fraction=½(1−cos(θ)).

In some cases, when θ may be small, the fraction may be given by:

Fraction=$\sin^2(\theta)/4$ or $NA^2/4$, where NA is numerical aperture. In some cases, the lens may be positioned in a gaseous medium, such as ambient air. In some cases, the lens may be positioned in a liquid medium.

In some cases, the systems described herein provide collection lenses with focal lengths that may be similar to the focal length of lenses that may focus a signal onto a corresponding detector. In some cases, a focal length of a collection lens may be equal to a focal length of a lens that may focus a signal onto a corresponding detector.

One or more detectors of the systems described herein may comprise one or more photodiodes. The one or more detectors may comprise a high responsivity to a signal comprising a wavelength similar to near-infrared light, such as about 700 nanometers to about 1300 nanometers. One or more detectors may be positioned or configured in an array of detectors. An array of detectors may match an array of wells received by the system. For example, the system may receive a 384 well plate and the system may be configured with an array of 384 corresponding detectors. An array of detectors may be assembled with one or more on-board trans-impedance amplifiers.

The systems described herein may provide a sampling rate of a signal from a well that may be greater than about: 100 Hertz (Hz), 250 Hz, 500 Hz, 750 Hz, 1,000 Hz, 2,000 Hz, 5,000 Hz, 6,000 Hz, 7,000 Hz, 8,000 Hz, 9,000 Hz, 10,000 Hz, 11,000 Hz, 12,000 Hz, 15,000 Hz or more. A system may provide a sampling rate of a signal across a plurality of wells that may be greater than about: 100 Hertz (Hz), 1,000 Hz, 5,000 Hz, 10,000 Hz, 15,000 Hz or more. A sampling rate may be from about 500 Hz to about 12,000 Hz. A sampling rate may be from about 500 Hz to about 5,000 Hz. A sampling rate may be from about 8,000 Hz to about 12,000 Hz. A sampling rate may be from at least about 100 Hz to about 15,000 Hz. A sampling rate may be from at least about 200 Hz to about 15,000 Hz. A sampling rate may be from at least about 300 Hz to about 15,000 Hz. A sampling rate may be from at least about 400 Hz to about 15,000 Hz. A sampling rate may be from at least about 500 Hz to about 15,000 Hz. A sampling rate may be from at least about 1,000 Hz to about 15,000 Hz.

Figure 3A:
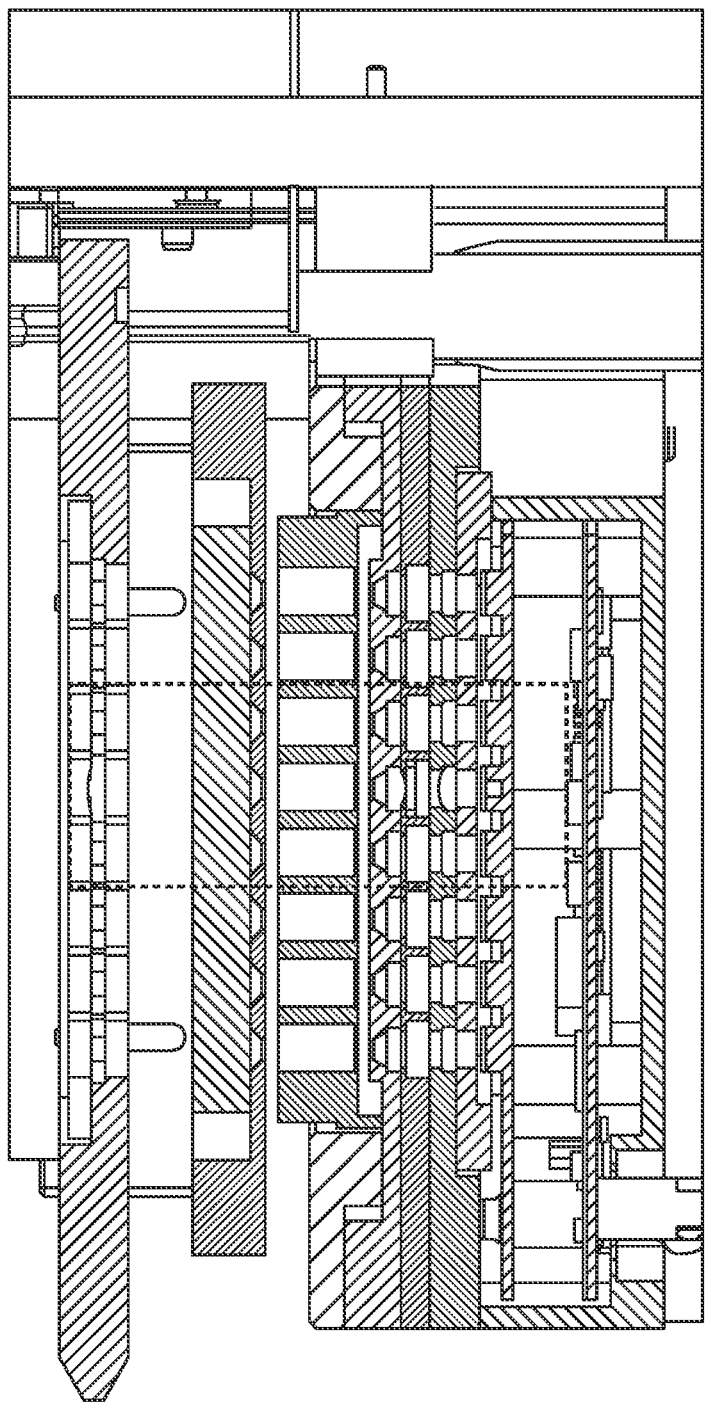
FIG. 3a shows a system setup.
Figure 3B:
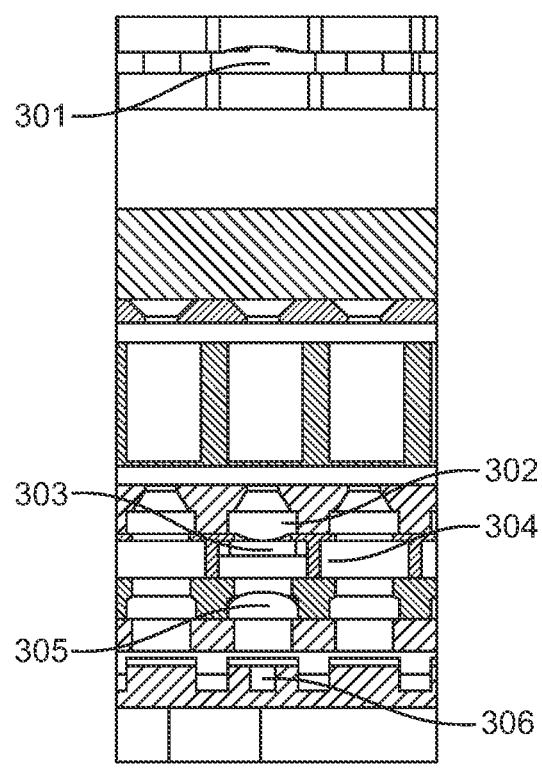
FIG. 3b shows the optical elements for a single well.
Figure 3C:
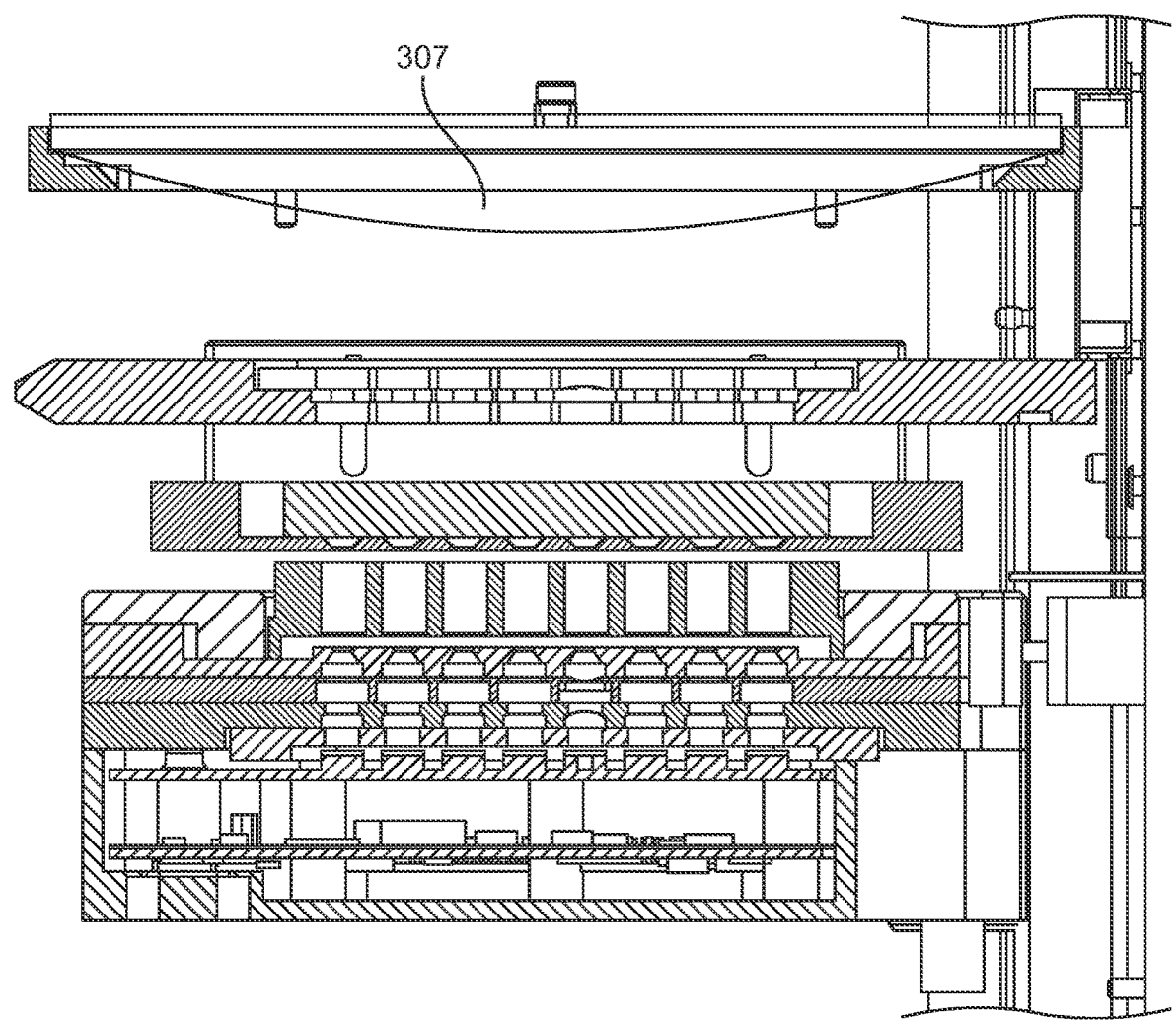
FIG. 3c shows the addition of a single collimation lens.

FIG. 3a shows a system as described herein. FIG. 3b shows a magnified subset of FIG. 3a, the magnified subset shown within the dotted line in FIG. 3a. In FIG. 3b, optical elements are highlighted for a well of a plurality of wells. A lens (such as a fluorescence collection lens) is shown as 302 in FIG. 3b and a filter (such as an emission filter) is shown as 303. The filter 303 may be positioned below the lens 302. The filter may be positioned above the lens. A lens (such as a lens that may focus a signal onto a detector, such as a photodiode detector) is shown as 305. The lens 305 may be positioned in a plate shown as 304. The detector (such as a detector that corresponds to a well of the plurality of wells) is shown as 306. A lens (such as a focusing lens) may be positioned above a microplate received by the system, the lens as shown as 301. Above a lens 301, the system may also comprise a lens (such as a collimation lens) shown as 307 in FIG. 3c. A collimation lens may be positioned above lens 301. In some systems as described herein, an excitation source may provide a divergent light that may be collimated by a lens, such as the collimation lens 307.

The systems as described herein may be employed in the technical field of environmental toxicology assessment of molecules (such as chemical substances) that may be typically performed using cultures of spontaneously active cortical neurons. Similar studies of spontaneously active or light-modulated neuronal firing patterns may also be performed.

The systems as described herein may be employed in the technical field of high throughput screening of ligand-modulated targets using photoactivatable ligands. Instead of using a light sensitive voltage modulator to control voltage-gated ion channel target activity, light-activatable ligands may be added to a cell medium and used to modulate the activity of targets. Targets may be present in cells due to native expression (in e.g. a neuron) or heterologous expression, and could be ion channels or G-proteins. Biological response of a sensor may be measured at one wavelength while the effective "dose" of a ligand may be controlled by modulating the duration or intensity of light of a second wavelength that may activate the ligand. A ligand may be a neurotransmitter (e.g. glutamate, GABA, acetylcholine, purine nucleotides), an ion (calcium), a small drug-like molecule, or a macromolecule. Ligands may be caged (permanently altered by light exposure), or photoswitchable (reversible light-induced activation/inactivation). In some cases, a glutamate photoswitchable ligand may interact with the LiGluR ion channel. This application may be extended to biochemical assays.

The systems as described herein may be employed in the technical field of high throughput screening of targets indirectly modulated by a light-sensitive actuator. In such cases, a light-activated receptor (e.g. melanopsin) or enzyme (e.g. adenylyl cyclase) may be controlled. Second messengers (e.g. phosphoinositide or cyclic-adenosine monophosphate (AMP)) may act upon a target, the function of which may be monitored optically.

The systems as described herein may be employed in the technical field of safety pharmacology. For example, in the technical field of safety pharmacology, the systems may be employed as part of an Integrated Human Cellular Studies being standardized in the Food and Drug Administration (FDA) Comprehensive in vitro Proarrythmia Assessment guidelines. The systems described herein, may be employed in safety pharmacology studies in optically-paced cardiomyocytes. The systems described herein may be employed in all-optical voltage-modulation and/or high throughput screening of ion channel targets. In such cases, the system may be configured for non-excitable cells and heterologously expressed ion channel target. The systems as described herein may be employed as an alternative or as a supplement to the traditional hERG screening.

For example, cells may be plated and allowed to grow or adhere to standard optical bottom 96 or 384 well plates. Cells may comprise: a) inducted pluripotent stem cell (iPSC) or stem cell derived cardiomyocytes that may be spontaneously active; b) cardiomyocytes that may heterologously express a light-sensitive actuator (usually channel rhodopsin) OR a mixture of cardiomyocytes plus non-excitable cells that may heterologously express channel rhodopsin; c) non-excitable cells engineered to heterologously express a light sensitive actuator AND one or more target ion channels (which may combine to make them excitable in a characteristic way); or d) any combination thereof. Cells may be stained with a voltage-sensitive dye (or any other fluorescent sensor). One or more molecules may be added to a portion of a plurality of wells. Molecule-containing wells may be compared to a number of control wells OR to baseline activity of each well measured prior to compound addition.

Voltage (or other sensor) changes may be monitored. For example, spontaneous activity may be monitored for about 30 seconds using one excitation light wavelength. Cellular activity may be induced or modulated by one or more actuating light pulses of a second wavelength. Light pulse regimens may vary in frequency, duration, intensity, or interpulse interval to affect light induced voltage changes. This variation may cause ion channel targets to adopt "non-resting" or transient conformational states that may interact differentially with molecules present in the well. The profiles of pharmacologic effects on cellular response using different illumination/activation protocols may have predictive therapeutic or toxicity implications.

Voltage (or other) traces may be first subjected to one or more standard electronic "long-pass" filtering algorithms to reduce electronic noise. Spontaneously active cell voltage traces may be analyzed using an in-house developed event detection algorithm. Events of interest such as action potentials ("beats" in the case of a cardiomyocyte) may be detected based on user-specified or controller-specified parameters which may guide the identification of features such as the precise temporal start and end points of each event, event upstroke duration, maximum magnitude (fluorescence change) of each event, duration of each event at specified fractions of maximal magnitude ("action potential duration"), or event rate, period, or rhythmicity. Induced or modulated activity traces may be analyzed using the event detection algorithm described above OR more commonly measurements may be made in defined regions of interest relative to the stimulating light pulses using a different software algorithm. The type of measurements may be similar to those described above.

The systems as described herein may be employed for methods of screening expressed ion channel targets in cells, such as non-excitable cells (i.e. HEK293 cells or CHO cells). The screening may be screening for heterologously expressed ion channels. For example, target ion channels, light-gated actuator proteins, and accessory ion channels may be expressed in non-excitable cells. Ion channels or accessory ion channels may comprise voltage-gated ion channels, ligand gated ion channels, or a combination thereof. Voltage-gated ion channels may comprise sodium channels, calcium channels, potassium channels, transient receptor potential (TRP) channels, proton channels, or any combination thereof. Ligand-gated ion channels may comprise acetylcholine receptor, ionotropic glutamate-gated receptor, acid sensing ion channel (ASIC), adenosine triphosphate (ATP)-gated P2X receptor, anion-permeable gamma-aminobutyric acid-gated (GABAa) receptor, or any combination thereof.

Light-gated actuator proteins may be stimulated with a wavelength of light, such as a light from an excitation source. The wavelength of light may be from about 400 nanometers to about 1000 nanometers. The wavelength of light may be from about 400 nanometers to about 800 nanometers. The wavelength of light may be from about 400 nanometers to about 500 nanometers. The wavelength of light may be from about 500 nanometers to about 600 nanometers. The wavelength of light may be from about 600 nanometers to about 700 nanometers. The wavelength of light may be from about 700 nanometers to about 800 nanometers. One or more cells may comprise a light-detectable sensor (such as a fluorescent dye) or a genetically encoded sensor or a combination thereof. Thus, cellular responses of target ion channels may be monitored via a signal, such as a fluorescence signal from a light-detectable sensor. A light-detectable sensor or genetically encoded sensor or a combination thereof may be excited a) at a first wavelength of light, such as from about 400 nanometers to about 500 nanometers, b) at a second wavelength of light, such as from about 600 nanometers to about 700 nanometers, or c) a combination thereof. Such light-detectable sensors or genetically encodes sensors may provide a signal that may indicative of a biological response or biological change, such as a change in a cell membrane potential or a change in an intracellular ion concentration. Alternations in the magnitude, temporal profile, or a combination thereof of the light-detectable sensor or genetically encoded sensor observed upon contacting one or more cells with a molecule thus may be indicative that such molecule may act upon a target ion channel, causing a biological response.

Target ion channels may comprise (i) voltage-gated channels such as voltage-gated sodium channels, voltage-gated calcium channels, or voltage-gated potassium channels, or combinations thereof, (ii) ion channels responsive to second messengers such as inositides (TRP family), cyclic nucleotides (HCNx, CNGx), calcium (KCax), or combination thereof; (iii) potassium 'leak' channels (K2Px); or (iv) any combination thereof.

Light-gated actuator proteins may comprise cation channels *Chlamydomonas* spp. Chop1, *Chlamydomonas* spp. Chop2, or proteins having greater than about 52% sequence homology, about 52% sequence length, or a combination thereof to Chop1 or Chop2. Light-gated actuator proteins may also comprise light-activated glutamate receptors (LiGluR), G-protein (such as melanopsin or mGluR), adenylate cyclase (bPAC), or any combination thereof.

Accessory ion channels may comprise voltage-gated inwardly rectifying potassium channels (Kirx) used to control resting cell membrane potential in conjunction with a defined extracellular potassium concentration. Accessory ion channels may also be voltage gated calcium, sodium, or potassium channels expressed in addition to the target ion channel.

Systems of the present disclosure may be employed for pharmacologic assessment of electrically excitable cells. The systems may be employed with spontaneously electrically active cells. For example, fluorescent voltage or calcium sensors may be incorporated into spontaneously electrically active cells. Light of a first wavelength may excite the sensor and emit fluorescence that may be collected over time. Sub-millisecond-scale perturbations in response parameters may be detected via an automated heuristic algorithm and may be used to predict potential target tissue toxicity. Spontaneously electrically active cells may be stem or induced pluripotent stem cell-derived cardiomyocytes, but may also be cortical neurons, dorsal root ganglion neurons, or stem cell derived neurons.

Systems of the present disclosure may be employed with optically-paced excitable cells. For example, a light-responsive actuator protein and a fluorescent voltage or calcium sensor may be introduced into a spontaneously active or quiescent electrically excitable cell. Timed pulses of light of one wavelength may pace the electrical activity of the excitable cell while a second wavelength may excite the fluorescent sensor. Perturbations in response parameters upon exposure to chemicals or proteins under different pacing conditions may be detected by an automated heuristic algorithm and may be used to predict potential target tissue toxicity.

Light responsive actuators may be *Chlamydomonas* spp. Chop1 or Chop2, or proteins having greater than about 52% sequence homology, about 52% sequence length, or a combination thereof to Chop1 or Chop2. In one embodiment, the actuator may be expressed in a non-excitable cell such as HEK293, and the actuator-expressing cells may be co-cultured along with the electrically excitable cells. In other embodiments, the light responsive actuator may be directly expressed in the excitable cells.

Optically paced excitable cells may be spontaneously active as described above or may be excitable quiescent cells including adult ventricular myocytes or skeletal myocytes.

In some cases, each well of a plurality of wells comprises a corresponding detector, such as a photodiode. In some cases, each photodiode has a corresponding lens. A lens may be configured to focus a signal, such as a light signal, onto a corresponding detector. Without a lens to focus a signal onto a corresponding detector, a portion of the signal may not be collected by the detector. A light signal may be collimated and may be further filtered through a filter. In such cases, a signal may be collected by the detection assembly and the light from the excitation source may not be collected. A filter may be configured in a fixed position or an adjustable position. One or more components of the system, such as the lens, detectors, filters, or a combination thereof, may be remotely controlled, electronically controlled, manually controlled by a user. Each filter of a system may be independently wired. The detection assembly collects a signal, such as a fluorescent dye, such as an intracellular calcium dye. In some cases, a controller of the system may employ an algorithm for processing of one or more signals collected from the system.

A system of the present disclosure may comprise one or more detectors, such as a photodiode. In some cases, the system may comprise at least two detectors, for example, a corresponding detector for each well of a plurality of wells.

In some cases, a detection assembly may comprise one or more signal collection optics. When the system comprises at least 2 signal collection optics, the numerical aperture of each signal collection optics may be (i) the same, such as both signal collection optics comprising a numerical aperture of about 0.5 or the numerical aperture of each may be (ii) different, such as when one signal collection optics comprises a numerical aperture of about 0.5 and a second signal collection optics comprises a numerical aperture of about 0.4. The numerical aperture of a signal collection optics may be about 0.2. The numerical aperture of a signal collection optics may be about 0.3. The numerical aperture of a signal collection optics may be about 0.4. The numerical aperture of a signal collection optics may be about 0.5. The numerical aperture of a signal collection optics may be about 0.6. The numerical aperture of a signal collection optics may be about 0.7. The numerical aperture of a signal collection optics may be about 0.8. The numerical aperture of a signal collection optics may be at least about 0.2. The numerical aperture of a signal collection optics may be at least about 0.3. The numerical aperture of a signal collection optics may be at least about 0.4. The numerical aperture of a signal collection optics may be at least about 0.5. The numerical aperture of a signal collection optics may be less than about 0.9. The numerical aperture of a signal collection optics may be less than about 0.8. The numerical aperture of a signal collection optics may be less than about 0.7. The numerical aperture of a signal collection optics may be less than about 0.6. The numerical aperture of a signal collection optics may be from about 0.2 to about 0.8. The numerical aperture of a signal collection optics may be from about 0.3 to about 0.7. The numerical aperture of a signal collection optics may be from about 0.4 to about 0.6.

A system of the present disclosure may comprise an excitation source, such as an illumination assembly may comprise an excitation source. The system may comprise at least 2 excitation sources. The system may comprise at least 3 excitation sources. The system may comprise at least 4 excitation sources. The system may comprise at least 5 excitation sources. The at least 2 excitation sources may be the same, such as a first laser and a second laser. The at least 2 excitation sources may be different, such as a laser and a light-emitting diode (LED) light. An excitation source may be a laser, an LED light, a xenon arc, or a mercury-vapor lamp. In some cases, the system comprises a single laser with a beam splitter to direct a portion of the light from the laser into a plurality of wells.

A sampling rate may be about 100 Hz. A sampling rate may be about 250 Hz. A sampling rate may be about 500 Hz. A sampling rate may be about 750 Hz. A sampling rate may be about 1,000 Hz. A sampling rate may be about 2,500 Hz. A sampling rate may be about 3,000 Hz. A sampling rate may be about 4,000 Hz. A sampling rate may be about 5,000 Hz. A sampling rate may be about 6,000 Hz. A sampling rate may be about 7,500 Hz. A sampling rate may be about 8,000 Hz. A sampling rate may be about 9,000 Hz. A sampling rate may be about 10,000 Hz. A sampling rate may be about 12,500 Hz. A sampling rate may be about 15,000 Hz. A sampling rate may be more than about 100 Hz. A sampling rate may be more than about 250 Hz. A sampling rate may be more than about 500 Hz. A sampling rate may be more than about 750 Hz. A sampling rate may be more than about 1,000 Hz. A sampling rate may be more than about 2,500 Hz. A sampling rate may be more than about 3,000 Hz. A sampling rate may be more than about 4,000 Hz. A sampling rate may be more than about 5,000 Hz. A sampling rate may be more than about 6,000 Hz. A sampling rate may be more than about 7,500 Hz. A sampling rate may be more than about 8,000 Hz. A sampling rate may be more than about 9,000 Hz. A sampling rate may be more than about 10,000 Hz. A sampling rate may be more than about 12,500 Hz. A sampling rate may be more than about 15,000 Hz. A sampling rate may be from about 200 Hz to about 10,000 Hz. A sampling rate may be from about 500 Hz to about 10,000 Hz. A sampling rate may be from about 1,000 Hz to about 10,000 Hz. A sampling rate may be from about 2,000 Hz to about 10,000 Hz. A sampling rate may be from about 5,000 Hz to about 10,000 Hz. A sampling rate may be from about 5,000 Hz to about 15,000 Hz.

A system of the present disclosure may illuminate at least a portion of a well of a plurality of wells with a light directed from an excitation source. In some cases, at least a portion of each well of the plurality of wells may be illuminated by the light directed from an excitation source. In some cases, a signal (such as an electrical signal) may be collected from a well of the plurality of wells and transferred to a detector, such as a corresponding detector. In some cases, a signal may be collected from each well of the plurality of wells and transferred to a detector. In some cases, the portion of a well that may be illuminated corresponds to a same portion of the well that the signal may be collected from and transferred to a detector. In some cases, the portion of a well that may be illuminated may be a different portion than the portion of the well from which the signal may be collected from. In some cases, a ratio of a portion of the light that may illuminates a well to a portion of the signal that may be collected from the well may be from about 1:0.5 to about 1:1.5. In some cases, the ratio may be about 1:1. In some cases, a ratio of a portion of the well that may be illuminated to a portion of the well than a signal may be collected from may be about 1:0.5 to about 1:1.5. In some cases, the ratio may be from about 1:0.75 to about 1:1.25. In some cases, the ratio may be from about 1:0.9 to about 1.1. In some cases, the ratio may be about 1:1. In some cases, the ratio may be about 1:0.5, 1:0.55, 1:0.6, 1:0.65, 1:0.7, 1:0.75, 1:0.8, 1:0.85, 1:0.9, 1:0.95, 1:1, 1:1.2, 1:1.3, 1:1.4, or 1:1.5.

A system of the present disclosure may comprise an excitation source to illuminate at least a portion of a well of a plurality of wells. In some cases, the excitation source may produce a light that comprises a wavelength from about $10^{-5}$ meters to about $10^5$ meters. In some cases, the light may comprises a wavelength from about $10^4$ meters to about $10^4$ meters. In some cases, the light may comprises a wavelength from about $10^{-3}$ meters to about $10^3$ meters. In some cases, the light may comprise a wavelength from about $10^{-2}$ meters to about $10^2$ meters. In some cases, the light may comprises a wavelength from about $10^{-4}$ meters to about $10^1$ meters. In some cases, the light may comprise visible light (such as light visible to the human eye), ultraviolet light, infrared light, or a combination thereof. In some cases, the light may comprises a wavelength from about 400 nanometers to about 1000 nanometers. In some cases, the light may comprise a wavelength from about 400 nanometers to about 900 nanometers. In some cases, the light may comprise a wavelength from about 400 nanometers to about 800 nanometers. In some cases, the light may comprise a wavelength from about 400 nanometers to about 500 nanometers. In some cases, the light may comprise a wavelength from about 600 to about 800 nanometers. In some cases, the light may comprise a wavelength from about 500 to about 700 nanometers. In some cases, the light may comprise a wavelength from about 500 to about 900 nanometers. In some cases, the light may comprise a wavelength from about 600 to about 900 nanometers. In some cases, the light may comprise a wavelength from about 700 to about 900 nanometers. In some cases, the light may comprise a wavelength from about 800 to about 900 nanometers.

A system of the present disclosure may comprise one or more excitation sources. A light intensity provided by an excitation source may be about 1 milliWatts per square millimeter (mW/mm$^2$). A light intensity provided by an excitation source may be about 1.5 mW/mm$^2$. A light intensity provided by an excitation source may be about 2 mW/mm$^2$. A light intensity provided by an excitation source may be about 2.5 mW/mm$^2$. A light intensity provided by an excitation source may be about 3 mW/mm$^2$. A light intensity provided by an excitation source may be about 3.5 mW/mm$^2$. A light intensity provided by an excitation source may be about 4 mW/mm$^2$. A light intensity provided by an excitation source may be about 4.5 mW/mm$^2$. A light intensity provided by an excitation source may be about 5 mW/mm$^2$. A light intensity provided by an excitation source may be about 5.5 mW/mm$^2$. A light intensity provided by an excitation source may be about 6 mW/mm$^2$. A light intensity provided by an excitation source may be about 6.5 mW/mm$^2$. A light intensity provided by an excitation source may be about 7 mW/mm$^2$. A light intensity provided by an excitation source may be about 7.5 mW/mm$^2$. A light intensity provided by an excitation source may be about 8 mW/mm$^2$. A light intensity provided by an excitation source may be about 8.5 mW/mm$^2$. A light intensity provided by an excitation source may be about 9 mW/mm$^2$. A light intensity provided by an excitation source may be about 9.5 mW/mm$^2$. A light intensity provided by an excitation source may be about 10 mW/mm$^2$. A light intensity provided by an excitation source may be greater than about: 2, 2.5, 3, 3.5, 4, 4.5, 5, 5.5, 6, 6.5, 7, 7.5, 8, 8.5, 9, 9.5, or 10 mW/mm$^2$.

A system of the present disclosure may provide a signal to noise ratio (SNR) of the signal detected by the system, such as the detection assembly. In some cases, the detected signal may be an electrical current signal. In some cases, the signal may be indicative of a change in a cell membrane potential or a change in an intracellular or extracellular ion concentration. In some cases, the SNR may be greater than about 5/10 milliVolt (mV) membrane potential change. In some cases, the SNR may be greater than about 10/10 mV cell membrane potential change. In some cases, the SNR may be greater than about 15/10 mV cell membrane potential change. In some cases, the SNR may be greater than about 20/10 mV cell membrane potential change. In some cases, the SNR may be greater than about 25/10 mV cell membrane potential change. In some cases, the SNR may be greater than about 30/10 mV cell membrane potential change. In some cases, the SNR may be greater than about 35/10 mV cell membrane potential change. In some cases, the SNR may be greater than about 40/10 mV cell membrane potential change. In some cases, the SNR may be greater than about 45/10 mV cell membrane potential change. In some cases, the SNR may be greater than about 50/10 mV cell membrane potential change.

A system of the present disclosure may provide an excitation source that provides light to a plurality of wells. The light may be a time constant light. The light may be a time varying light, such as a pulsed light. In some cases, a pulsed light may be pulsed at varying time intervals. In some cases, a pulsed light may be pulsed at specific time intervals, such as timed pulses of light. Timed pulses of light may be about 200 milliseconds in duration. Timed pulses of light may be about 100 milliseconds in duration. Timed pulses of light may be about 80 milliseconds in duration. Timed pulses of light may be about 60 milliseconds in duration. Timed pulses of light may be about 40 milliseconds in duration. Timed pulses of light may be about 20 milliseconds in duration. Timed pulses of light may be about 10 milliseconds in duration. Timed pulses of light may be less than about 200 milliseconds in duration. Timed pulses of light may be less than about 100 milliseconds in duration. Timed pulses of light may be less than about 80 milliseconds in duration. Timed pulses of light may be less than about 60 milliseconds in duration. Timed pulses of light may be less than about 40 milliseconds in duration. Timed pulses of light may be less than about 20 milliseconds in duration. Timed pulses of light may be less than about 10 milliseconds in duration.

A system of the present disclosure may provide a protein or fragment thereof for contacting with a cell that may be added to a well of the plurality of wells of the system. A protein or fragment thereof may have at least about: 52%, 55%, 60%, 65%, 70%, 75%, 80%, 85%, 90%, 95%, 96%, 97%, 98%, or 99% sequence homology to a known protein. For example, a protein or fragment thereof may have at least about 52% sequence homology, about 52% sequence length, or a combination thereof to a Chop1 protein. A protein or fragment thereof may have at least about: 52%, 55%, 60%, 65%, 70%, 75%, 80%, 85%, 90%, 95%, 96%, 97%, 98%, or 99% sequence homology, sequence length, or a combination thereof to a Chop1 protein. A protein or fragment thereof may have at least about: 52%, 55%, 60%, 65%, 70%, 75%, 80%, 85%, 90%, 95%, 96%, 97%, 98%, or 99% sequence homology, sequence length, or a combination thereof to a Chop2 protein. A protein or fragment thereof may have at least about: 52%, 55%, 60%, 65%, 70%, 75%, 80%, 85%, 90%, 95%, 96%, 97%, 98%, or 99% sequence homology, sequence length or a combination thereof to a LiGluR.

A light intensity of an excitation source may vary in time. In some cases, when a system comprises one than one excitation source, each excitation may comprises a light intensity that may the same or different than the other excitation sources. A light intensity of an excitation source may be adjustable, such as adjusted by a controller of the system or a user of the system. A light intensity across of plurality of wells may be the same, such as about 5 mW/mm$^2$ for each well of the plurality. A light intensity across a plurality of wells may not vary by more than about 5%, such as 5 mW/mm$^2$ +/−0.25 mW/mm$^2$. A light intensity across a plurality of wells may not vary by more than about: 1%, 2%, 3%, 4%, 5%, 6%, 7%, 8%, 9%, or 10%. When a system comprises more than one excitation source, a light intensity across a plurality of excitation sources may not vary between each excitation source by more than about: 1%, 2%, 3%, 4%, 5%, 6%, 7%, 8%, 9%, or 10%.

In cases where a light intensity may vary in time, such as when a controller or user may adjust a light intensity, a lag or delay in the change in the light intensity may be less than about 15 milliseconds (millisec). A lag in the change in a light intensity of an excitation source may be less than about 10 millisec. A lag in the change in a light intensity of an excitation source may be less than about 9 millisec. A lag in the change in a light intensity of an excitation source may be less than about 8 millisec. A lag in the change in a light intensity of an excitation source may be less than about 7 millisec. A lag in the change in a light intensity of an excitation source may be less than about 6 millisec. A lag in the change in a light intensity of an excitation source may be less than about 5 millisec. A lag in the change in a light intensity of an excitation source may be less than about 4 millisec. A lag in the change in a light intensity of an excitation source may be less than about 3 millisec. A lag in the change in a light intensity of an excitation source may be less than about 2 millisec. A lag in the change in a light intensity of an excitation source may be less than about 1 millisec.

A system of the present disclosure may be configured to receive an array of wells, such as a microwell plate or an array of cuvettes. An array of wells may be a microwell plate, such as a commercially available microwell plate or a custom-designed microwell plate. An array of wells may be formed of glass (such as borosilicate glass), plastic (such as polypropylene, polyethylene, polyethylene terephthalate G, polymethylpentene), or a combination thereof. An array of wells may have wells comprising flat or rounded bottoms. An array of wells may be a 6 well plate, a 16 well plate, a 32 well plate, a 96 well plate, or a 384 well plate. An array of wells may comprise a plurality of wells. A plurality of wells may comprise: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, 1000 wells or more. A plurality of wells may comprise from about 1 to about 20 wells. A plurality of wells may comprise from about 1 to about 100 wells. A plurality of wells may comprise from about 10 wells to about 400 wells. A plurality of wells may comprise from about 50 wells to about 1000 wells. A plurality of wells may comprise at least 3 wells. A plurality of wells may comprise at least 5 wells. A plurality of wells may comprise at least 8 wells. A plurality of wells may comprise at least 10 wells. A plurality of wells may comprise at least 11 wells. A plurality of wells may comprise at least 15 wells. A plurality of wells may comprise at least 20 wells. A plurality of wells may comprise at least 31 wells. A plurality of wells may comprise at least 95 wells. A plurality of wells may comprise at least 100 wells. A plurality of wells may comprise at least 200 wells. A plurality of wells may comprise at least 383 wells.

A system of the present disclosure may comprise a plurality of wells and a well of the plurality of wells may be configured to receive a cell. In some cases, a well of the plurality of wells may be configured to receive a plurality of cells. In some cases, the plurality of cells may be the same in each well of the plurality of wells. In some cases, the plurality of cells may be different in each well of the plurality of wells. In some cases, a well of the plurality may comprises about: 2, 5, 10, 20, 30, 40, 50, 60, 70, 80, 90, 100, 125, 150, 175, 200, 250, 300, 350, 400, 450, 500, 600, 700, 800, 900, 1000, 1500, or 2000 cells.

In some cases, the plurality of cells in a well may be from about 1 cell to about 100 cells. In some cases, the plurality of cells in a well may be from about 1 cell to about 200 cells. In some cases, the plurality of cells in a well may be from about 1 cell to about 500 cells. In some cases, the plurality of cells in a well may be from about 1 cell to about 1,000 cells. In some cases, the plurality of cells in a well may be from about 1 cell to about 2,000 cells. In some cases, the plurality of cells in a well may be from about 10 cells to about 100 cells. In some cases, the plurality of cells in a well may be from about 10 cells to about 500 cells. In some cases, the plurality of cells in a well may be from about 500 cells to about 1,000 cells. In some cases, the plurality of cells in a well may be from about 500 cells to about 2,000 cells. In some cases, the plurality of cells in a well may be from about 100 cells to about 500 cells.

In some cases, the plurality of cells in a well of the plurality of wells may be at least about 10 cells. In some cases, the plurality of cells in a well of the plurality of wells may be at least about 50 cells. In some cases, the plurality of cells in a well of the plurality of wells may be at least about 100 cells. In some cases, the plurality of cells in a well of the plurality of wells may be at least about 250 cells. In some cases, the plurality of cells in a well of the plurality of wells may be at least about 500 cells. In some cases, the plurality of cells in a well of the plurality of wells may be at least about 750 cells. In some cases, the plurality of cells in a well of the plurality of wells may be at least about 1000 cells. In some cases, the plurality of cells in a well of the plurality of wells may be at least about 2000 cells.

In some cases, the plurality of cells in a well of the plurality of wells may be less than about 10 cells. In some cases, the plurality of cells in a well of the plurality of wells may be less than about 50 cells. In some cases, the plurality of cells in a well of the plurality of wells may be less than about 100 cells. In some cases, the plurality of cells in a well of the plurality of wells may be less than about 250 cells. In some cases, the plurality of cells in a well of the plurality of wells may be less than about 500 cells. In some cases, the plurality of cells in a well of the plurality of wells may be less than about 750 cells. In some cases, the plurality of cells in a well of the plurality of wells may be less than about 1000 cells. In some cases, the plurality of cells in a well of the plurality of wells may be less than about 2000 cells.

A system of the present disclosure may detect a presence or an absence of activation of a light-detectable sensor within a well of a plurality of wells. The system may detect the presence or absence in each well of a plurality of wells. The system may be configured to detect the presence or absence by employing a detection assembly. The system may detect the presence or absence of a light-detectable sensor within a well of the plurality of wells in less than about 1 minute. The system may detect in less than about 40 seconds. The system may detect in less than about 30 seconds. The system may detect in less than about 20 seconds. The system may detect in less than about 10 seconds. The system may detect in less than about 1 second. The system may detect in less than about 100 milliseconds (millisec). The system may detect in less than about 50 millisec. The system may detect in less than about 10 millisec. The system may detect in less than about 1 millisec.

The system may detect a presence or an absence of a light-detectable sensor within each well of the plurality of wells in less than about 1 minute. The system may detect within each well of the plurality of wells in less than about 30 seconds. The system may detect within each well of the plurality of wells in less than about 10 seconds. The system may detect within each well of the plurality of wells in less than about 1 second. The system may detect within each well of the plurality of wells in less than about 100 millisec. The system may detect within each well of the plurality of wells in less than about 50 millisec. The system may detect within each well of the plurality of wells in less than about 10 millisec. The system may detect within each well of the plurality of wells in less than about 1 millisec.

The system may collect one or more signals from each well of a plurality of wells (such as 6 wells, 12 wells, 96 wells, 384 wells) within a time frame of less than about 20 second. The system may collect one or more signals from each well of a plurality of wells within less than about: 20 seconds, 15 seconds, 10 seconds, 5 seconds, 1 second, 100 milliseconds, 50 milliseconds, 10 milliseconds, 1 millisecond or less.

The system may collect one or more signals from each well of the plurality of wells. The system may collect more than one signal. The system may collect about: 2, 3, 4, 5, 6, 7, 8, 9, 10 or more signals from a well. The system may collect at least two signals wherein the two signals are the same, such as a train of two action potentials. The system may collect at least two signals wherein the two signals are different, such as a voltage-gated event and an ion-gated event. Two or more signals within a well may occur sequentially in time, such as a train of two action potentials. Two or more signals within a well may occur substantially in parallel or simultaneously, such as a voltage-gated event and an ion-gated event.

Computer Control Systems

Figure 4:
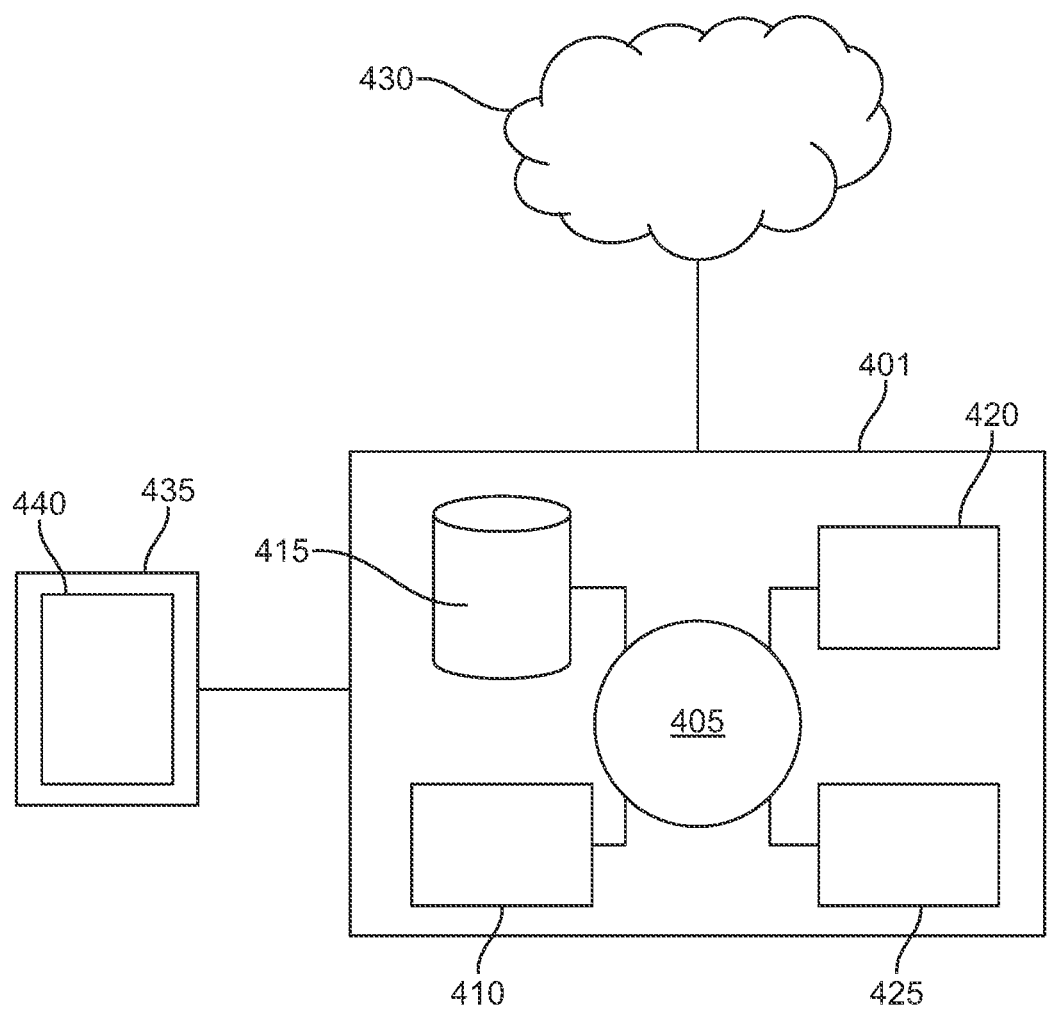
FIG. 4 shows a computer control system that is programmed or otherwise configured to implement methods provided herein.

The present disclosure provides computer control systems that are programmed to implement methods of the disclosure. FIG. 4 shows a computer system 401 that is programmed or otherwise configured to (i) control an excitation source to provide light to a plurality of wells, (ii) control a direction of a light, such as directing the light to an area of a well in the microplate, (iii) control a detection assembly to collect and/or transfer information (such as an electrical signal) to a database or memory, or others. The computer system 401 can regulate various aspects of data collection, data analysis, and data storage of the present disclosure, such as, for example, (i) controlling an excitation source, (ii) controlling a detection assembly, (iii) controlling a light path or a portion of a well that receives the light, (iv) controlling a frequency of collection and/or transfer of information (such as an electrical signal), or others. The computer system 401 can be an electronic device of a user or a computer system that is remotely located with respect to the electronic device. The electronic device can be a mobile electronic device.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user (e.g., portable PC, tablet PC, Smart phones). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430

Methods as described herein can be implemented by way of machine (e.g., computer processor) executable code stored on an electronic storage location of the computer system 401, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440 configured to provide or receive information, such as, (i) a confirmation of detection of a sensor, such as a light-sensitive sensor, (ii) a percent area of a well or a percentage of cells in a well that emit a sensor, (iii) a setting of the system, such as an intensity of a light source or a type of light source used, or others. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, (i) compare information acquired by the detection assembly to information stored in a database of the system, (ii) confirm a presence or absence of a sensor, such as a light-detectable sensor, or others.

Kits

A kit may comprise instructions for use and a system as described herein, such as a system comprising a detection assembly and an illumination assembly. The kit may further comprise one or more arrays, one or more sensors (such as light-detectable sensors) or a combination thereof.

EXAMPLE 1: SCREENING OF EXPRESSED ION CHANNEL TARGETS IN NON-EXCITABLE CELLS

Intracellular calcium fluorescent indicator Fluo4 is added to a plurality of HEK293 cells engineered to express a light-sensitive actuator, Chop2, and a voltage-gated calcium channel. The plurality of HEK293 cells containing the Fluo4 indicator is divided in wells of a microplate. A molecule is added to a portion of the wells of the microplate. Then, HEK293 cells within each of the wells are simultaneously and repetitively stimulated with a light source having a 494 nanometer (nm) wavelength. The stimulus is provided by an illumination assembly. Cellular responses within each well are simultaneously monitored by detecting the emission of the Fluo-4 indicator at a wavelength of 516 nm. A photodiode of a detection assembly detects the fluorescent emission. A magnitude or a temporal profile of the fluorescent emission confirms that the molecule acts upon one or more transient voltage-dependent conformations of the calcium ion channel.

EXAMPLE 2: SCREENING OF EXPRESSED ION CHANNEL TARGETS IN NON-EXCITABLE CELLS

Cell membrane potential indicator BeRST is added to a plurality of HEK293 cells engineered to express a light sensitive actuator, Chop2, and a voltage-gated ion channel, sodium channel Nav1.7. The plurality of HEK293 cells containing the BeRST indicator are divided in wells of a microplate. A molecule is added to a portion of the wells of the microplate. Then, HEK293 cells within each of the wells are simultaneously stimulated with a light source having a 658 nanometer (nm) wavelength. Pulses of 460 nm light independently activate the actuator leading to a transient repetitive activation of the sodium channel Nav1.7. The stimulus is provided by an illumination assembly. Cellular responses within each well are simultaneously monitored by detecting the emission of the BeRST indicator at a wavelength of 683 nm. A photodiode of a detection assembly detects the fluorescent emission. A magnitude or a temporal profile of the fluorescent emission confirms that the molecule acts upon one or more transient voltage-dependent conformations of the voltage-gated sodium ion channel.

EXAMPLE 3: PHARMACOLOGIC ASSESSMENT OF ELECTRICALLY EXCITABLE CELLS—SPONTANEOUSLY ACTIVE CELLS

Voltage sensitive dye VF2.1.Cl is added to a plurality of cardiomyocytes differentiated from IPS cells. The plurality of cardiomyocytes comprising the VF2.1.Cl-indicator is divided in wells of a microplate. A chemical compound is added to a portion of the wells of the microplate. Then, cardiomyocytes within each of the wells is simultaneously stimulated with a light source having a 460 nanometer (nm) wavelength. The stimulus is provided by an illumination assembly. Cellular responses within each well are simultaneously monitored by detecting the emission of the VF2.1.Cl indicator at a wavelength of 516 nm. A photodiode of a detection assembly detects the fluorescent emission. Sub-millisecond-scale perturbations in action potential duration or depolarization velocity are detected by an automated heuristic algorithm and are used to predict potential target tissue toxicity.

EXAMPLE 4: PHARMACOLOGIC ASSESSMENT OF ELECTRICALLY EXCITABLE CELLS—OPTICALLY-PACED EXCITABLE CELLS

A plurality of cardiomyocytes are differentiated from induced pluripotent stem (IPS) cells and are modified to express a light-responsive actuator protein, Chop2 Voltage-sensitive dye BeRST is added to the plurality of the cardiomyocytes. The plurality of cardiomyocytes comprising the BeRST indicator and expressing the light-responsive actuator, Chop2, is divided in wells of a microplate. A molecule is added to a portion of the wells of the microplate. Then, cardiomyocytes within each of the wells are simultaneously stimulated with timed pulses of a first pacing of light and timed pulses of a second pacing of light. Both the first pacing and the second pacing occur at a first wavelength of 460 nm while a second excitation wavelength of 660 nm is provided to excite the BeRST indicator. The light stimulus is provided by an illumination assembly. Cellular responses within each well are simultaneously monitored by detecting the emission of the BeRST indicator at a wavelength of 690 nm. A detection assembly detects the fluorescent emission. Perturbations in response to two different pacing conditions are detected by an automated heuristic algorithm and are used to predict potential heart rate-dependent target tissue toxicity.

EXAMPLE 5: SAFETY PHARMACOLOGY ASSAY ON SPONTANEOUSLY BEATING CARDIOMYOCYTES

Figure 6A:
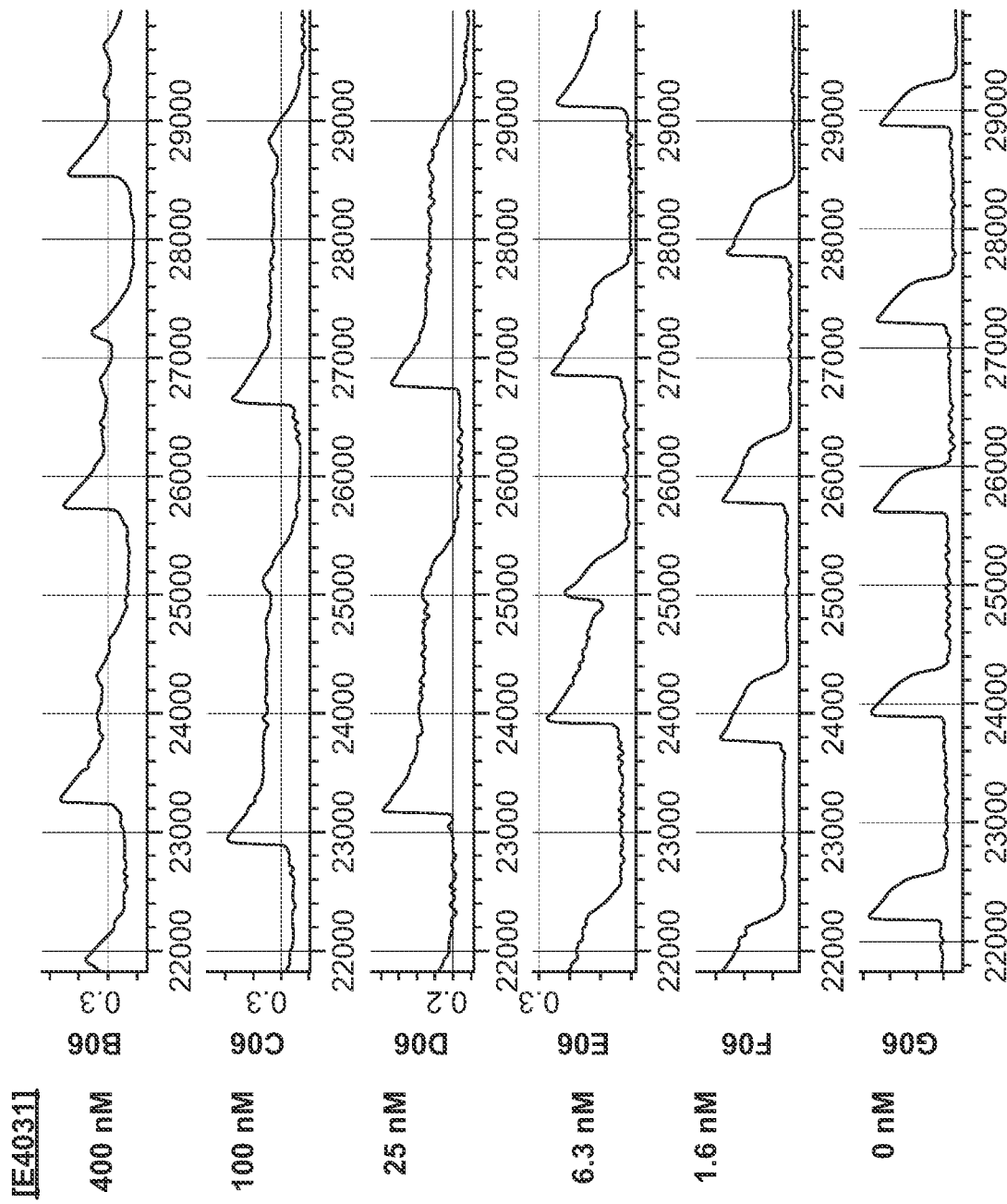
FIG. 6a-b shows a safety pharmacology assay on spontaneously beating cardiomyocytes.
Figure 6B:
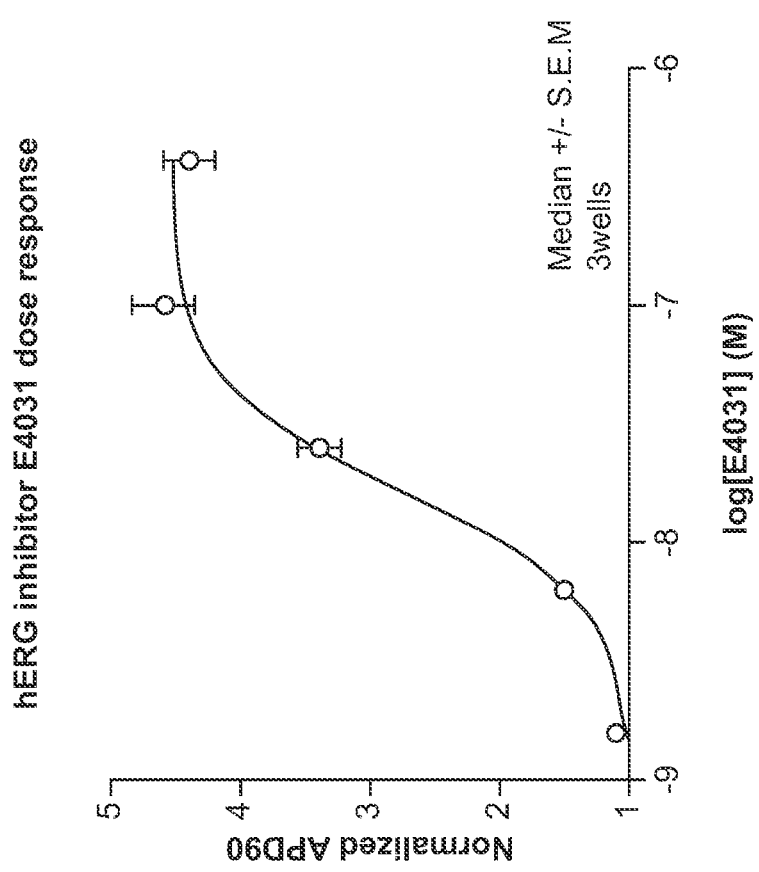

Induced pluripotent stem cell-derived cardiomyocytes were grown in 384 well microtiter plates until spontaneous beating activity was observed. Cells were stained with a voltage-sensitive dye. A hERG inhibitor, E4031, was added at various concentrations (400 nM, 100 nM, 25 nM, 6.3 nM, 1.6 nM, 0 nM), as shown in FIG. 6a, to different wells of the 384 well microtiter plate. Changes in fluorescence emission of the voltage-sensitive dye were simultaneously collected in all 384 wells for a period of 20 seconds. From the collected data, action potentials were identified by proprietary software and the action potential durations at 90% repolarization (APD90) were measured and converted to dose responses of the hERG inhibitor, E4031, as shown in FIG. 6b.

EXAMPLE 6: DUAL-WAVELENGTH STIMULATION AND MONITORING OF SODIUM CHANNEL ACTIVITY

Figure 7:
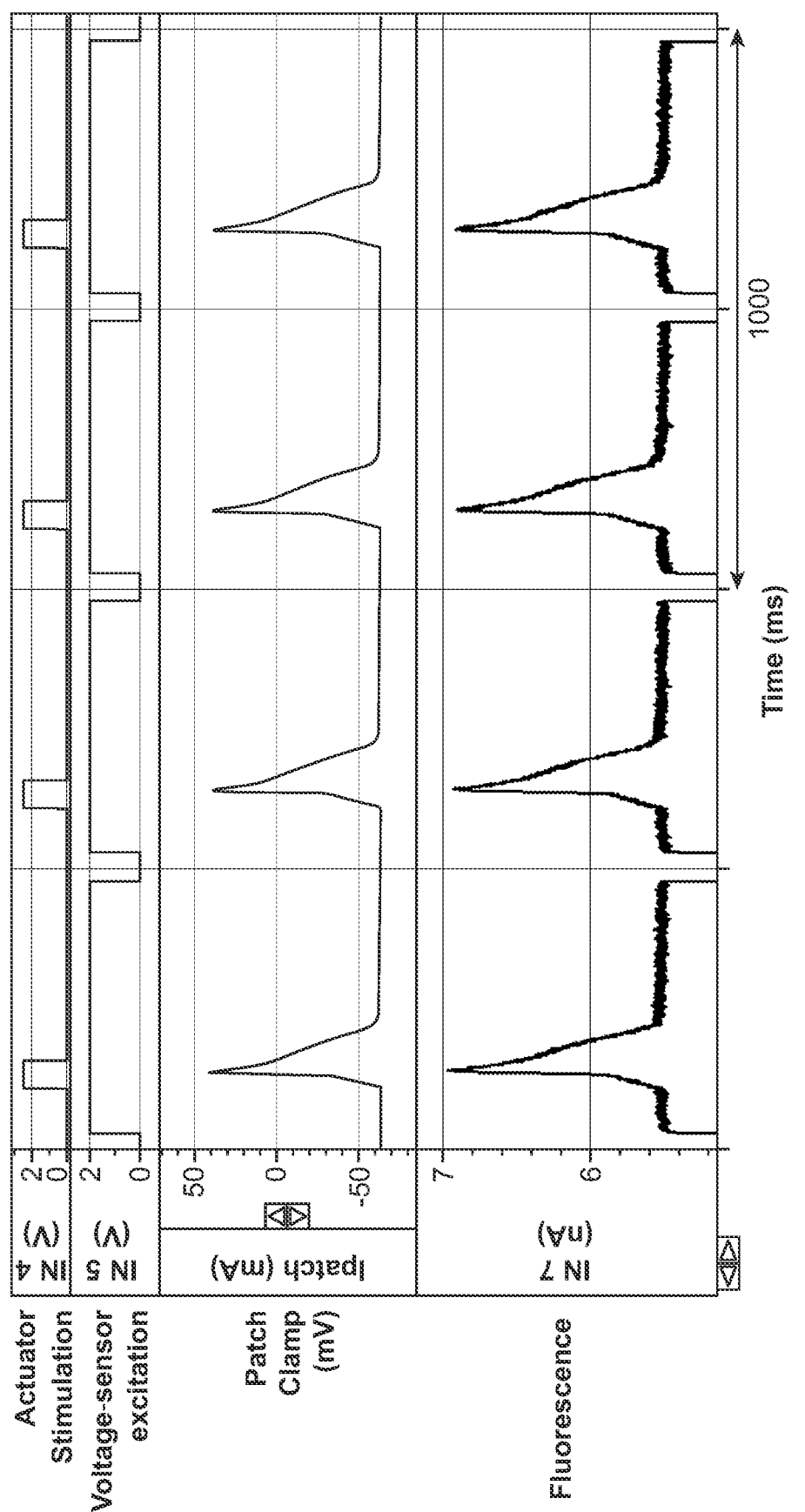
FIG. 7 shows dual-wavelength stimulation and monitoring of sodium channel activity.

HEK 293 cells were engineered to express the Nav1.7 sodium channel, a light-sensitive actuator ion channel, and an accessory potassium ion channel to control resting membrane potential. Cell monolayers in microtiter plates were stained with a voltage-sensitive fluorescent dye. As shown in FIG. 7, the voltage-sensitive fluorescent dye was excited and the emitted fluorescence was monitored in near infrared wavelengths, while pulses of blue light partially depolarized the cell membrane potential leading to a transient sodium channel activity and action potential voltage traces seen in the fluorescence readout. Voltage traces from a patch-clamped cell in the monolayer is shown for comparison.

EXAMPLE 7: SIMULTANEOUS MULTIWALL ACQUISITION AND AUTOMATED CHARACTERIZATION OF CARDIOMYOCYTE ACTION POTENTIALS USING A NEAR-INFRARED VOLTAGE SENSING DYE

Figure 8A:
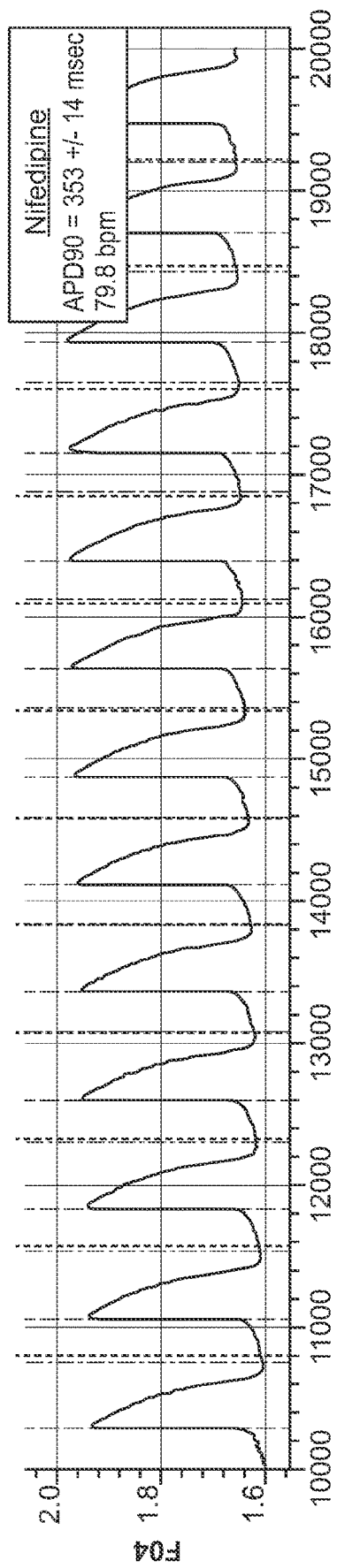
FIG. 8a-b shows simultaneous multiwall acquisition and automated characterization of cardiomyocyte action potentials using a near-infrared voltage sensing dye.
Figure 8B:
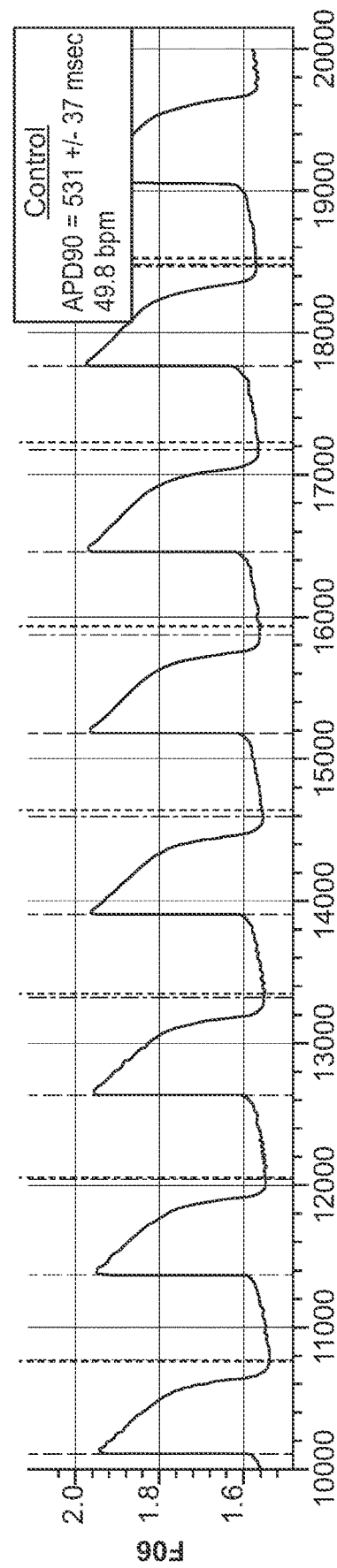

Spontaneously beating cardiomyocytes were grown in a 384 well microtiter plate stained with a near-infrared voltage sensing dye and illuminated continuously with 660 nm light. As shown in FIG. 8a-b, fluorescence emission was recorded for 20 seconds and the start (solid vertical lines) and end (dotted vertical lines) of each action potential was detected using a proprietary algorithm. Reduced action potential duration at 90% repolarization (APD90) of about 353+/−14 millisecond (msec) and reduced beat period of about 79.8 beats per minute (bpm) were observed in wells containing the tachycardia-inducing drug nifedipine (Adalata®, Procardia®, CAS number 21829-25-4) (FIG. 8a) as compared to a APD90 of about 531+/−37 msec and about 49.8 bpm in a control group (FIG. 8b). Two traces of 96 simultaneously-acquired traces are shown.

EXAMPLE 8: DUAL-WAVELENGTH RECORDING AND PACING OF CARDIOMYOCYTES ACTION POTENTIALS

Figure 9A:
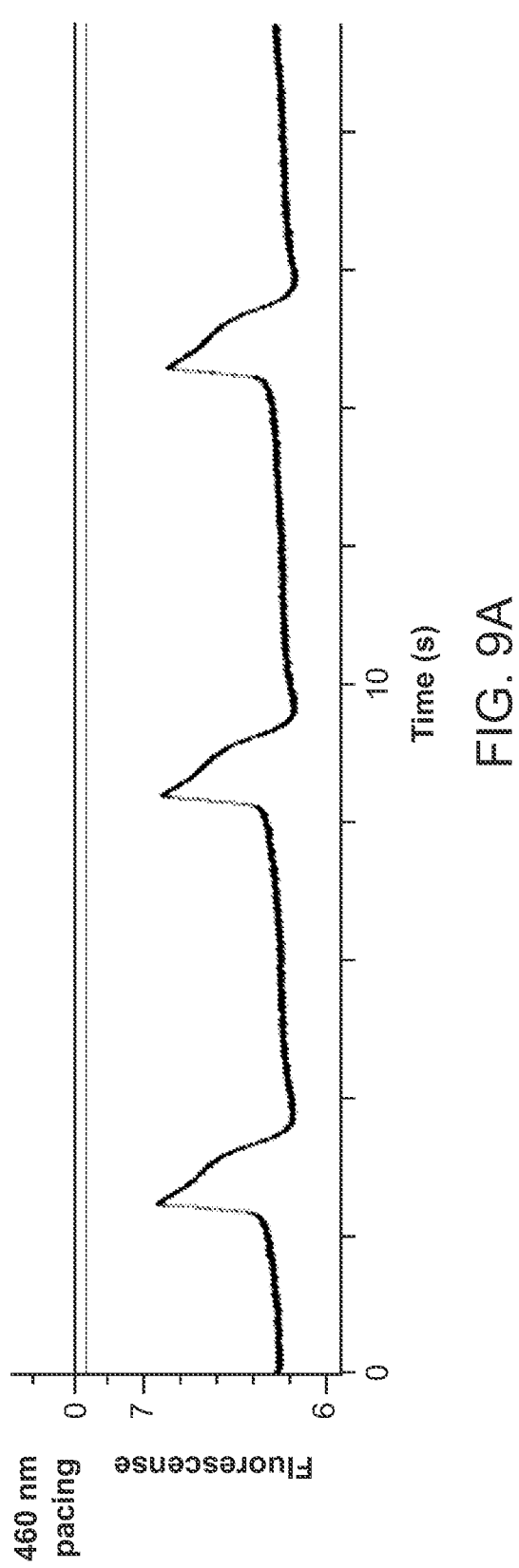
FIG. 9a-b shows a dual-wavelength recording and pacing of cardiomyocytes action potentials.
Figure 9B:
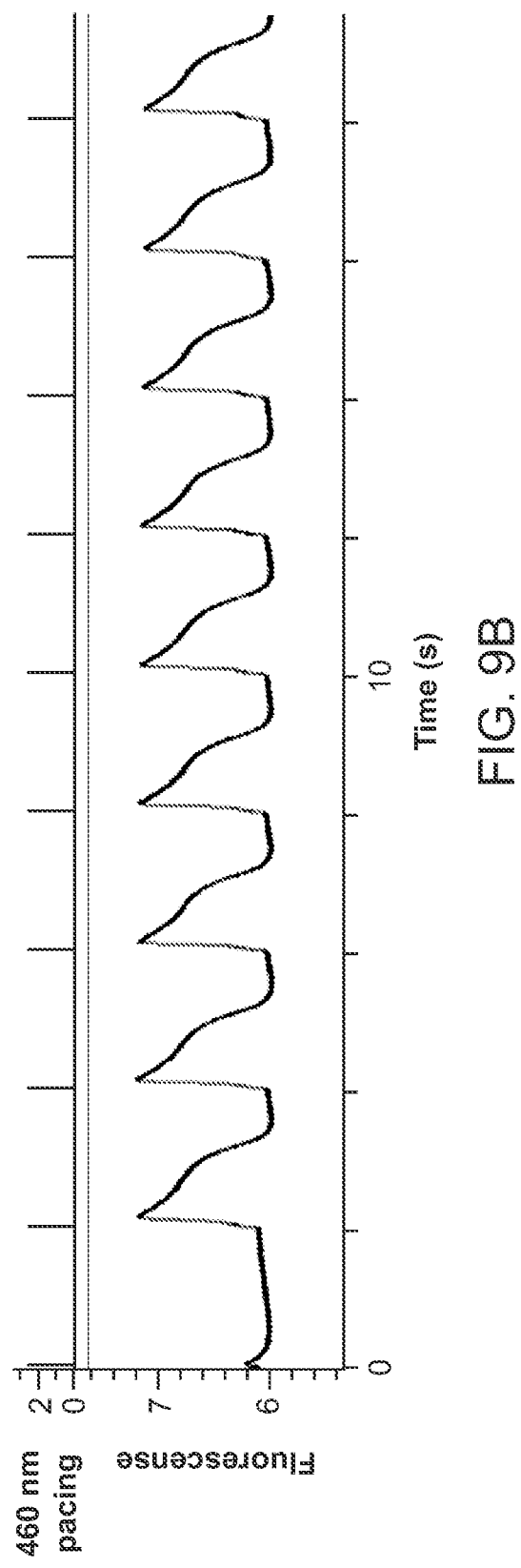

Cardiomyocytes were co-cultured in a microtiter plate with HEK293 cells expressing a light-gated bacterial channel-rhodopsin and stained with a near-infrared voltage-sensing dye. As shown in FIG. 9a-b, low frequency spontaneous action potentials were recorded (FIG. 9a), followed by action potential recordings induced by a train of about 460 nanometer (nm) 0.5 Hz pacing pulses (FIG. 9b) via electrical coupling of the cardiomyocytes and engineered HEK293 cells.

EXAMPLE 9: SIMULTANEOUS MULTIWALL DUAL-WAVELENGTH STIMULATION AND RECORDING OF SODIUM CHANNEL ACTIVITY USING A NEAR-INFRARED VOLTAGE SENSING DYE

Figure 10A:
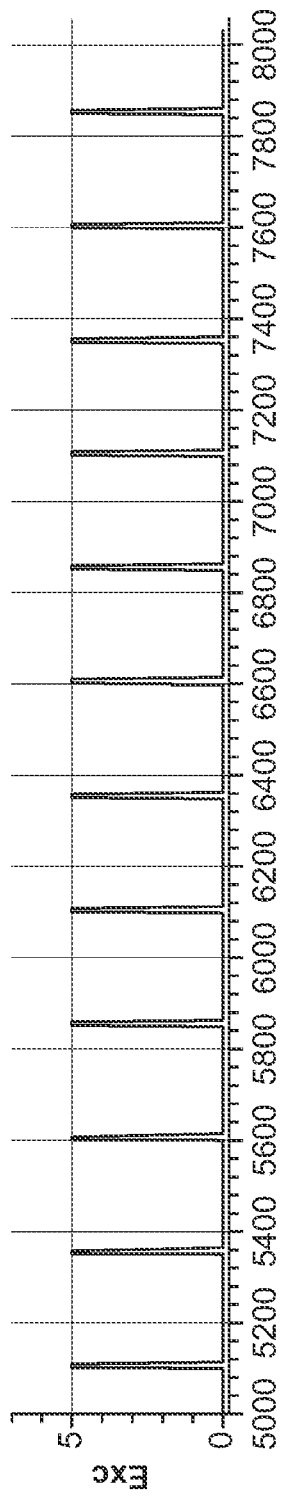
FIG. 10a-c shows simultaneous multiwall dual-wavelength stimulation and recording of sodium channel activity using a near-infrared voltage sensing dye.
Figure 10B:
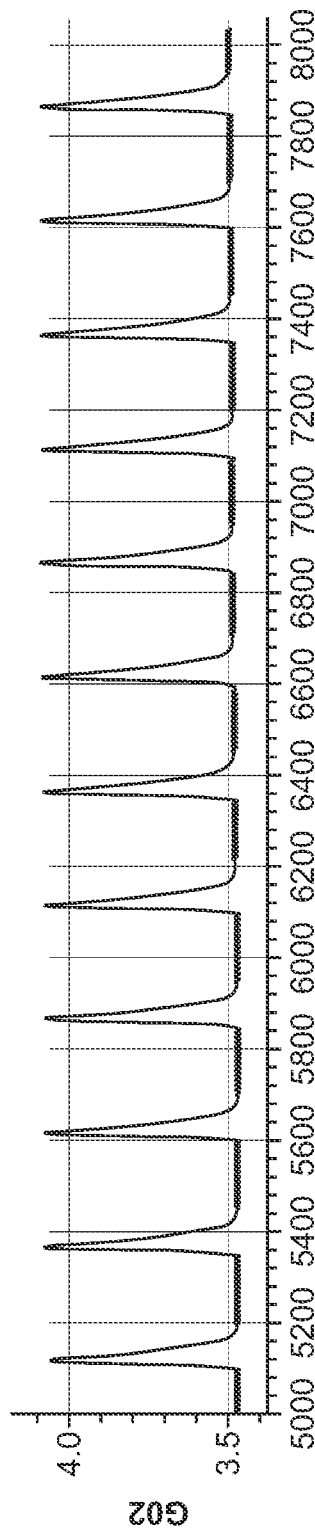
Figure 10C:
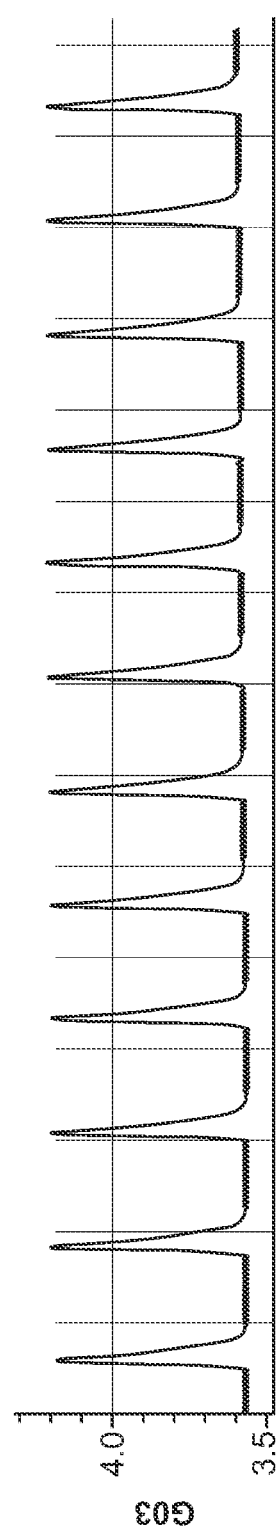

HEK293 cells engineered to express a bacterial channel-rhodopsin in combination with the human Nav1.7 voltage-gated sodium channel were grown in microtiter plates and stained with a near-infrared voltage-sensing dye. As shown in FIG. 10a-c, wells were continuously illuminated with about 660 nanometer (nm) light and about 4 Hz 10 millisecond pulses of about 460 nm light (FIG. 10a) to stimulate action potentials. Two traces of 96 simultaneously measures fluorescence traces are shown in FIG. 10b-c.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of detecting a light-detectable sensor in a plurality of cells comprising:
   (a) providing an array of wells comprising a plurality of wells, wherein each well of the plurality of wells comprises at least a cell of the plurality of cells, and wherein at least a portion of the plurality of cells comprise the light-detectable sensor;
   (b) directing a light from an excitation source to each well of the plurality of wells to illuminate at least a portion of each well of the plurality of wells to form an at least partially illuminated well;
   (c) collecting a signal from each well of the plurality of wells, wherein the collecting occurs substantially in parallel; and
   (d) transferring the signal from each well of the plurality of wells to a corresponding detector, wherein a lens is configured to focus at least a portion of the signal from each well onto the corresponding detector, and wherein the transferring occurs substantially in parallel,
   wherein the signal confirms a presence or an absence of activation of the light-detectable sensor, and wherein a sampling rate across the plurality of wells is greater than about 100 Hz.

2. The method of claim 1, wherein the plurality of cells comprises a cardiomyocyte.

3. The method of claim 1, wherein the plurality of wells is greater than 5 wells.

4. The method of claim 1, wherein collecting the signal from each well of the plurality of wells occurs simultaneously.

5. The method of claim 1, wherein collecting and transferring the signal from each well of the plurality of wells occurs simultaneously.

6. The method of claim 1, wherein the corresponding detector is an optical detector.

7. The method of claim 1, wherein the signal is converted to an electrical current signal by the detector.

8. The method of claim 1, wherein the sampling rate is from about 500 Hz to about 12,000 Hz.

9. The method of claim 1, wherein the corresponding detector comprises a signal collection optics, and wherein a numerical aperture of the signal collection optics is from about 0.2 to about 0.8.

10. The method of claim 1, wherein the excitation source provides a light intensity of greater than about 5 milliWatts per square millimeter (mW/mm$^2$) to one or more wells of the plurality of wells.

11. The method of claim 1, wherein the corresponding detector comprises a photodiode.

12. The method of claim 1, wherein each corresponding detector corresponds to a different well of the plurality of wells.

13. The method of claim 1, wherein the lens comprises a focusing lens.

14. The method of claim 1, wherein the lens comprises a single collimation lens.

15. The method of claim 1, wherein the corresponding detector is configured to detect a light comprising a wavelength from about 10−7 to about 10−5 meters.

16. The method of claim 1, wherein each corresponding detector of the plurality of corresponding detectors corresponds to a different well of the plurality of wells.

17. The method of claim 1, wherein the array of wells comprises 6 wells, 12 wells, 32 wells, 96 wells, or 384 wells.

18. The method of claim 1, wherein the light-detectable sensor comprises a sensor to detect a change in (i) a cell membrane potential, (ii) an intracellular concentration of an ion, (iii) a protein conformation, or (iv) any combination thereof.

19. The method of claim 18, wherein the sensor detects the change in the intracellular concentration of the ion, and wherein the sensor comprises fura-2, indo-1, fluo-3, fluo-4, fluo-5F, fluo-5N, Rhod-2, calcium green, calcium red, fura-Red, Quin-2, a salt of any of these, or any combination thereof.

20. The method of claim 18, wherein the sensor detects the change in the intracellular concentration of the ion, and wherein the ion is a calcium ion, sodium ion, a potassium ion, a hydrogen ion, a chlorine ion, or any combination thereof.

* * * * *